US012045318B2

(12) United States Patent
Hoffman et al.

(10) Patent No.: US 12,045,318 B2
(45) Date of Patent: Jul. 23, 2024

(54) CONVOLUTIONAL NEURAL NETWORKS FOR EFFICIENT TISSUE SEGMENTATION

(71) Applicant: Intuitive Surgical Operations, Inc., Sunnyvale, CA (US)

(72) Inventors: Brian D. Hoffman, Mountain View, CA (US); Geoffrey A. Richmond, San Jose, CA (US); Siddarth Sen, San Jose, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 476 days.

(21) Appl. No.: 17/293,004

(22) PCT Filed: Nov. 14, 2019

(86) PCT No.: PCT/US2019/061542
§ 371 (c)(1),
(2) Date: May 11, 2021

(87) PCT Pub. No.: WO2020/102584
PCT Pub. Date: May 22, 2020

(65) Prior Publication Data
US 2021/0406596 A1  Dec. 30, 2021

Related U.S. Application Data

(60) Provisional application No. 62/767,351, filed on Nov. 14, 2018.

(51) Int. Cl.
*G06V 10/82* (2022.01)
*G06F 18/20* (2023.01)
(Continued)

(52) U.S. Cl.
CPC .......... *G06F 18/285* (2023.01); *G06F 18/214* (2023.01); *G06F 18/2163* (2023.01);
(Continued)

(58) Field of Classification Search
CPC ............. G06V 10/82; G06V 2201/031; G06V 2201/03
See application file for complete search history.

(56) References Cited

U.S. PATENT DOCUMENTS

2014/0205187 A1* 7/2014 Kang .................... G06F 18/254
382/159
2015/0324999 A1* 11/2015 Gritsenko ............... G06T 7/174
382/132
(Continued)

FOREIGN PATENT DOCUMENTS

EP    3504680 A1    7/2019

OTHER PUBLICATIONS

International Preliminary Report on Patentability for Application No. PCT/US2019/061542, mailed on May 27, 2021, 11 pages.
(Continued)

*Primary Examiner* — Ming Y Hon
(74) *Attorney, Agent, or Firm* — Foley & Lardner LLP

(57) ABSTRACT

An imaging system is provided for pixel-level segmentation of images comprising: a camera to capture images of an anatomical object and to represent the images in two-dimensional (2D) arrangements of pixels; one or more processors and a non-transitory computer readable medium with information including: CNN instructions to cause the one or more processors to implement a CNN configured to associate anatomical object classifications with pixels of the 2D arrangements of pixels; and multiple sets of weights, to differently configure the CNN based upon different camera image training data; and a display screen configured to display the two-dimensional (2D) arrangements of classified pixels and the anatomical object classifications.

16 Claims, 13 Drawing Sheets

(51) Int. Cl.
  *G06F 18/21* (2023.01)
  *G06F 18/214* (2023.01)
  *G06F 18/24* (2023.01)
  *G06N 3/04* (2023.01)

(52) U.S. Cl.
  CPC .............. *G06F 18/24* (2023.01); *G06N 3/04* (2013.01); *G06V 10/82* (2022.01); *G06V 2201/031* (2022.01)

(56) References Cited

U.S. PATENT DOCUMENTS

| | | | |
|---|---|---|---|
| 2016/0174902 A1* | 6/2016 | Georgescu | G06V 10/454 600/408 |
| 2017/0193340 A1* | 7/2017 | Shtok | G06V 30/19147 |
| 2018/0061059 A1 | 3/2018 | Xu et al. | |
| 2018/0114113 A1* | 4/2018 | Ghahramani | G06N 3/08 |
| 2018/0218503 A1* | 8/2018 | Xu | G06T 7/174 |
| 2018/0293552 A1* | 10/2018 | Zhang | G06N 3/08 |
| 2019/0019020 A1* | 1/2019 | Flament | G06F 18/213 |
| 2019/0080453 A1* | 3/2019 | Song | G06T 7/73 |
| 2019/0236362 A1* | 8/2019 | Srivastava | G06F 18/24137 |
| 2019/0318497 A1* | 10/2019 | Zhao | A61B 6/0407 |
| 2019/0336034 A1* | 11/2019 | Bore | A61B 5/708 |
| 2020/0005422 A1* | 1/2020 | Subramanian | G06T 7/194 |
| 2020/0043179 A1* | 2/2020 | Chauvin | G06N 20/00 |
| 2020/0069175 A1* | 3/2020 | Kumagai | A61B 3/0025 |
| 2020/0184647 A1* | 6/2020 | Harrison | G16H 30/40 |
| 2020/0253504 A1* | 8/2020 | Shen | A61B 5/01 |
| 2021/0217164 A1* | 7/2021 | Weese | G06V 20/64 |
| 2021/0325894 A1* | 10/2021 | Faust | G06N 3/008 |
| 2022/0207819 A1* | 6/2022 | Dmukhin | G06N 3/045 |
| 2023/0068386 A1* | 3/2023 | Akdeniz | G06N 3/063 |
| 2023/0169657 A1* | 6/2023 | Wu | G06N 3/084 382/128 |

OTHER PUBLICATIONS

International Search Report and Written Opinion for Application No. PCT/US2019/061542, mailed Jun. 23, 2020, 18 pages.

Suraj Srinivas., et al., "Deep Learning for Medical Image Analysis, Chapter 2.3.1 Region-Based CNNS" In: Deep Learning for Medical Image Analysis, Jan. 30, 2017, pp. 34-35.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

Face Up
Unclassified

Face Down
Unclassified

Right Side
Unclassified

Left Side
Unclassified

Face Up
Classified

Face Down
Classified

Right Side
Classified

Left Side
Classified

US 12,045,318 B2

CONVOLUTIONAL NEURAL NETWORKS FOR EFFICIENT TISSUE SEGMENTATION

CLAIM OF PRIORITY

This application is a U.S. National Stage Filing under 35 U.S.C. 371 from International Application No. PCT/US2019/061542, filed on Nov. 14, 2019, and published as WO 2020/102584 A1 on May 22, 2020, which claims the benefit of priority to U.S. Provisional Patent Application No. 62/767,351, filed on Nov. 14, 2018, each of which is incorporated by reference herein in its entirety.

BACKGROUND

A surgical scene may be viewed through a camera during a minimally invasive surgical or diagnostic procedure. Accurate identification of anatomical tissue type is required to perform the procedure. Convolutional Neural Networks (CNNs) have been used to perform per pixel segmentation of image pixel data. Classification can be more challenging due to variations in appearance of the same kind of tissue type and due to similarities in the appearance of different tissue types.

DESCRIPTION OF EMBODIMENTS

A. Convolutional Neural Network

Figure 1:
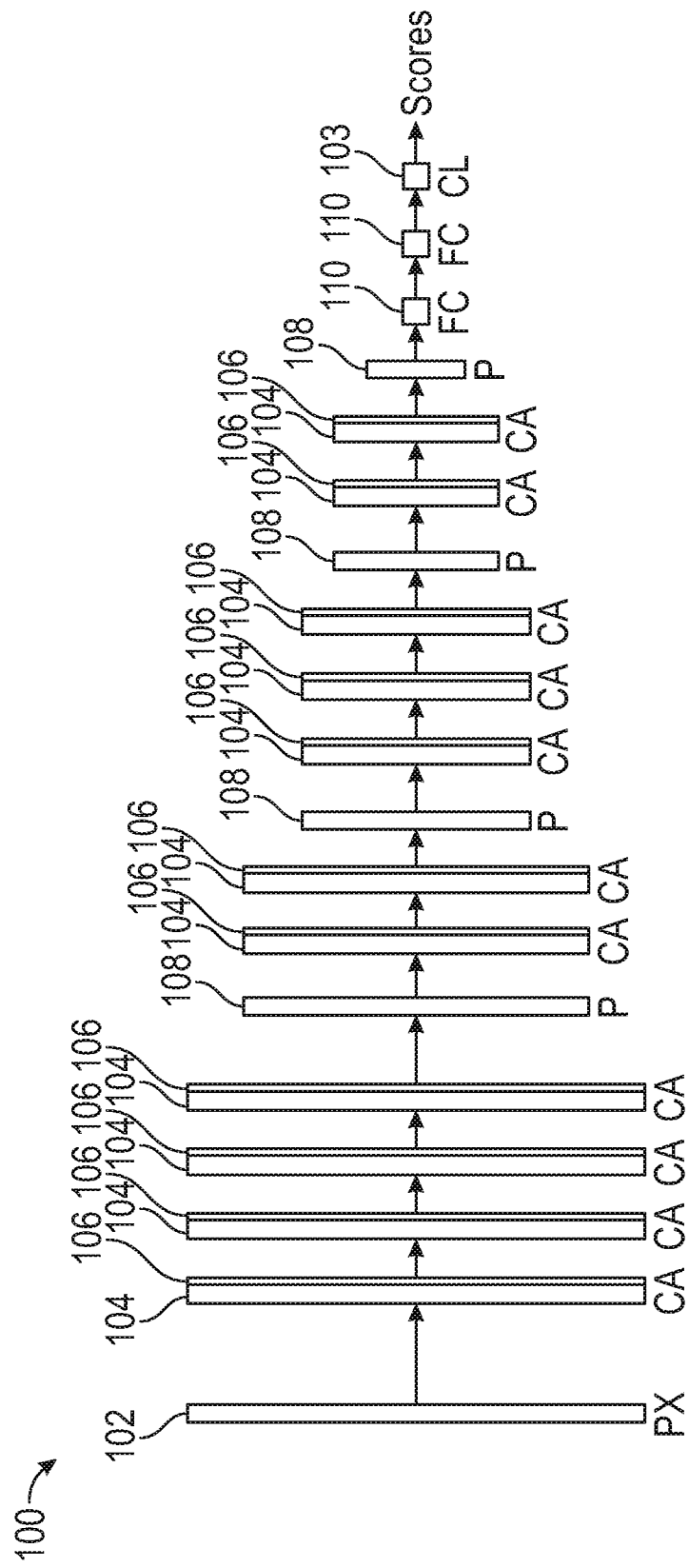
FIG. 1 is an illustrative block diagram representing an example convolutional neural network (CNN).

FIG. 1 is an illustrative block diagram representing an example region proposal convolutional neural network (R-CNN) 100. A computer system may be configured with executable instructions stored in a computer readable storage medium to implement the CNN 100. CNNs have been used for image classification, which typically involves taking an input image and outputting a class (e.g., car, airplane, boat, bicycle, etc.) or a probability of classes that best describes an object shown in the input image. The CNN 100 receives as input a two-dimensional array of pixel values (PX) 102 and provides as an output a set of classification scores. The CNN 100 includes a plurality of processing layers. Specifically, the CNN 100 includes convolution (C) layers 104 combined with non-linear activation function (A) layers (e.g., RELU layers) 106, pooling (P) layers 108 and fully connected (FC) network layers 110 and a classifier layer (CL) 103, such as softmax classifier. Each layer is associated with an array of values, referred to as weights. During training of the CNN 100, training data in the form of a multiplicity of training data input images are provided as input to the CNN 100 to train the CNN 100, through adjustment of the weights within the CNN layers, to accurately classify object images.

More particularly, the CNN 100 performs image classification by looking for low level image features such as edges and curves, and then building up to more complex combinations of image features through a series of convolutional layers. The CNN 100 includes multiple convolution layers in a sequence used to build up a complex image feature map based upon an input image. Each convolution layer 104 identifies certain image features; different convolution layers may identify different image features. Each convolution layer applies a filter corresponding to image features to be identified by the layer. A filter may be configured with a two-dimensional array of numbers, often referred to as weights, to be applied across a two-dimensional array of input values input to the convolution layer to produce an array of output values output from the layer. A convolution layer often is followed by a nonlinear (or activation) layer 106, typically a rectified linear unit (ReLU), although other functions may be used (e.g., tanh, sigmoid). At each convolution layer 104, a filter comprising an array of weights slides, or convolves, around an array of input values to the convolution layer, to align the filter weights with input values at each of a plurality of successive locations of the input value array. At each location, individual weights of the filter are multiplied with individual input values aligned with the weights at that location, and the resulting multiplication products are added to produce an output value corresponding to the location. The output value is provided at a position within an activation layer 106 that corresponds to the location of the input value array used to produce it.

An activation layer 106 that receives output values from a previous convolution layer 104 of the sequence may act as an input layer to a subsequent convolution layer 104 of the sequence. An input image 102 provided to an initial convolution layer 104 of the CNN 100 typically includes a two-dimensional array of pixel values representing a visual image captured by a camera, for example. Each pixel value of the two-dimensional array may include RGB color information. Thus, separate RGB color information is provided for each pixel of the two-dimensional array. The sequence of convolution layers 104 performs a sequence of convolutions that each may identify different low level image features of the image such as edges and curves. The successive convolution layers 104 and activation layers 106 results in combinations of image features that together represent higher level image features such as semicircles (combination of curve and straight edge) or squares (combinations of several straight edges). In general, convolutional layers 104 deeper within the CNN 100 have larger receptive fields, which means that they can consider information from a larger area of the original input volume. In other words, deeper convolution layers may be more responsive to a larger region of pixel space.

Activation layers 106 may be interspersed between convolution layers 104 to provide nonlinearities and to preserve dimension to control overfitting. More particularly, a non-linear activation function layer may be included after each convolution layer to add a non-linearity. A non-linear activation function layer may include a tanh, sigmoid or ReLU function, for example. A pooling layer 108 may be included following some ReLU activation function layers 106 to perform a pooling function that may include a downsampling of the number of values in the ReLU layer. The reasoning behind a pooling layer 108 is that once it is known that a specific image feature is present within an input image, its exact location is not as important as its relative location to the other image features. Maxpooling is an example of a well-known pooling technique that can downsample by selecting the largest ReLU value within each pooling filter, such as a 2×2 filter, as the filter slides across an array of ReLU values. A pooling layer 108 can significantly reduce the spatial dimension of input activation layers 106, which can reduce the number of weights required for convolution and thereby lessen computation cost. A pooling layer 108 also may control overfitting, which can occur when a model is so tuned to the training examples that it is not able to generalize well for the validation and test sets.

One or more fully connected network (FCN) layers 110 may be included near the end of a CNN 100 to perform classifications. The one or more FC layers 110 may receive an input value array from a convolution layer 104, activation layer 106 or pooling layer 108 that precedes them and outputs an N-dimensional vector, where N is the number of classes that the CNN 100 has to choose among. Each number in the N dimensional vector may represent a probability of a certain class. Basically, the one or more FC layers 110 determine for each class, a probability that the high-level image features represented by a received input value array correlate to that class. See, A. Garcia-Garcia, et al., A Review on Deep Learning Techniques Applied to Semantic Segmentation, arXiv:1704.06857 [cs.CV], Apr. 22, 2017.

B. Object Identification with R-CNN

Figure 2:
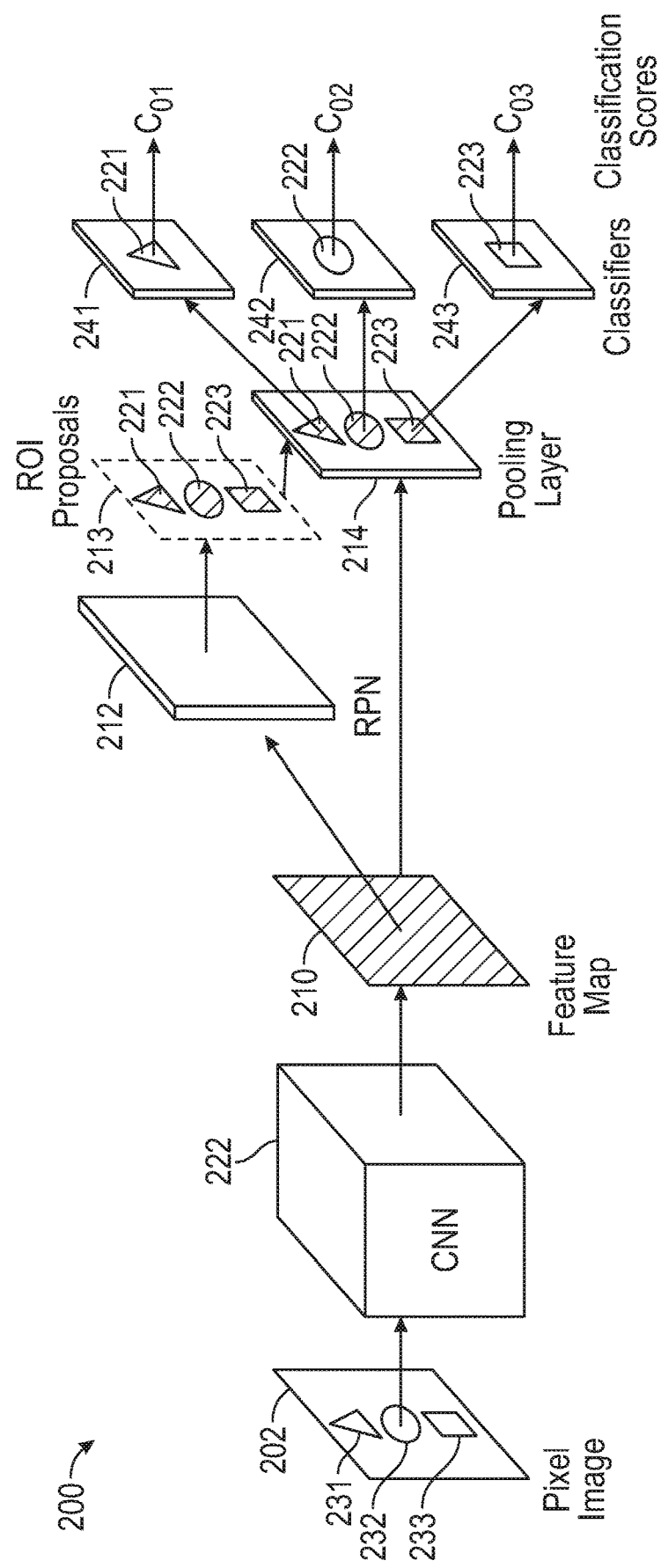
FIG. 2 is an illustrative functional block diagram representing image processing information flow within an example region proposal CNN (R-CNN) configured to perform pixel-level image segmentation.

FIG. 2 is an illustrative functional block diagram representing image processing information flow within an example regional proposal CNN (R-CNN) 200 configured to perform object detection. A computer system may be configured with executable instructions stored in a computer readable storage medium to implement the CNN 200. Details of different interspersed layers, which may include convolution layers, activation layers, pooling layers and fully connected network (FCN) layers such as those described above, are omitted to simplify the drawing. The CNN 200 receives as input a two-dimensional array of pixel values 202 and provides as an output an image feature map 210. A region proposal network (RPN) 212 defines region of interest (ROI) proposals (indicated within dashed lines) 213, which for example, may include respective first, second and third bounding boxes 221, 222, 223 corresponding to first second and third regions of interest 231, 232, 233 within the pixel image 202, based upon the image feature map 210. The image feature map 210 and the bounding box information 221, 222, 223 may be provided to a pooling layer 214. A first object classifier 241 produces a first classification score $C_{O1}$, corresponding to feature information associated with the first bounding box 221. A second object classifier 242 produces a second classification score $C_{O2}$, corresponding to image feature information associated with the second bounding box 222. A third object classifier 243 produces a third classification score $C_{O3}$, corresponding to image feature information associated with the third bounding box 223. Thus, multiple different object images 231, 232, 233 within an input image may be separately classified $C_{O1}$, $C_{O2}$, $C_{O3}$, and pixels of the input image 202 corresponding to the classified objects may be spatially segmented according to the classification based upon the region that bounds the classified object. It will be appreciated that in accordance with embodiments herein, the regions of interest comprise individual pixels rather than bounding boxes that encompass a plurality of pixels.

Thus, in response to receiving an input image 202 the R-CNN 200 proposes separate regions of interest 221, 222, 223 of the image 202 that may display separate objects. In some embodiments, image feature information within each proposed region is provided separately to the object classifiers 241, 242, 243 to separately determine its classification or a set of probable classifications. In some embodiments, the respective object classifiers 241, 242, 243 extract separate image feature vector information for each separate respective bounding box region 221, 222, 223 and provide the image feature vector information to a classifier such as a set of Support Vector Machines (SVMs) trained for each class for output classification. Thus, separate objects within separate proposed regions may be separately classified. See, S. Ren et al., Faster R-CNN: Towards Real-Time Object Detection with Region Proposal Networks, arXiv: 1506.01497v3 [csCV] Jan. 6, 2016: V. Badrinarayanan et al. SegNet: A Deep Convolutional Encoder-Decoder Architecture for Image Segmentation, ArXiv:1511.oo561v3 [cs.CV] Oct. 10, 2016; K. He et al. Mask R-CNN, arXiv: 1.703.06870v2 [csCV] Apr. 5, 2017.

Figure 3:
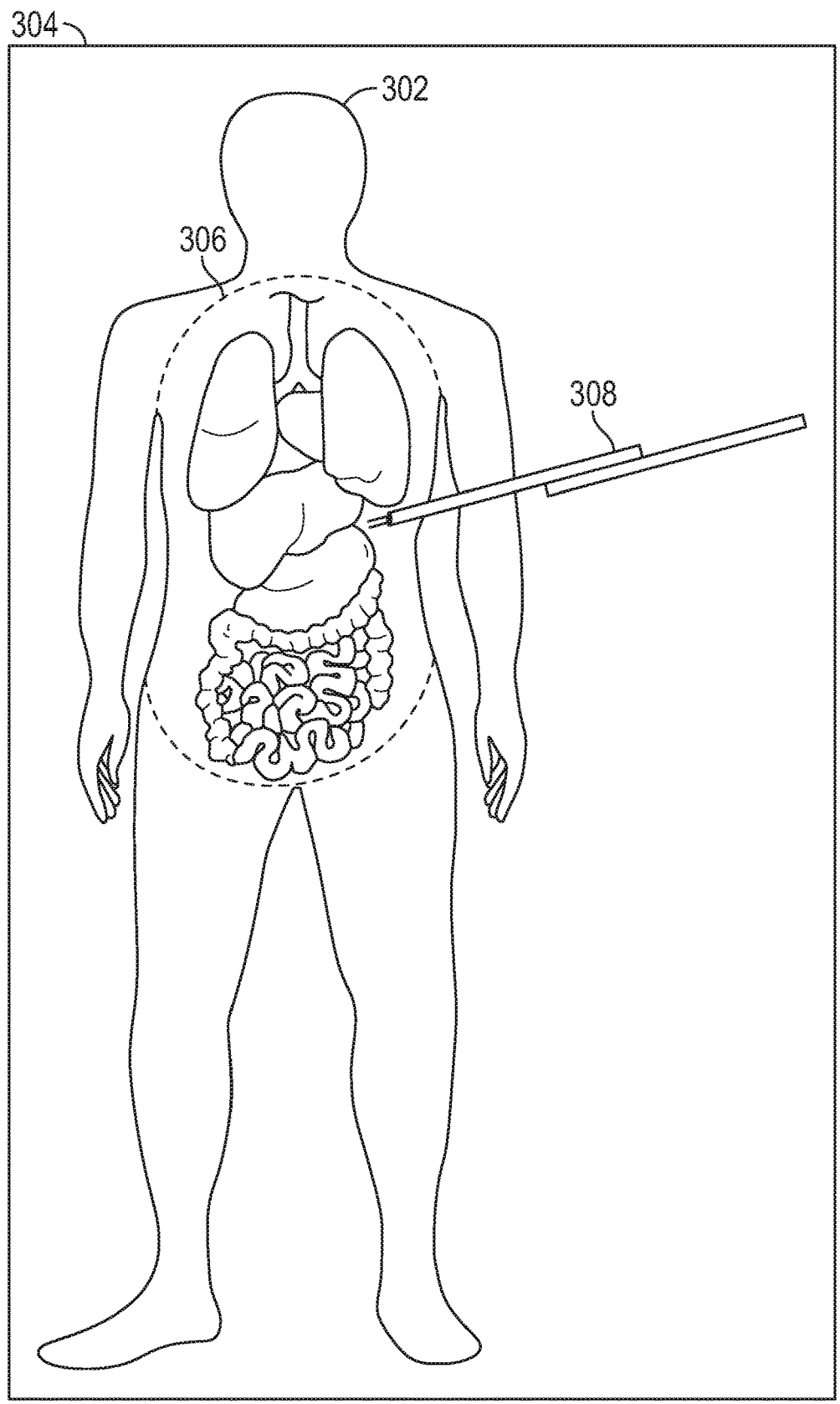
FIG. 3 is an illustrative drawing representing a patient P disposed face-up on an operating room table.

C. Alignment of an Anatomical Atlas with a Patient's Anatomy to Determine Position of Anatomical Objects Internal to the Anatomy FIG. 3 is an illustrative drawing representing a patient 302 disposed face-up on an operating room table 304 aligned with an anatomical atlas 306 representing internal organs. The anatomical atlas 306 is represented as aligned with the patient's anatomy to provide an indication of tissue types such as lung (L), heart (H), stomach (S) kidneys (K) and intestines (I), for example, internal to the patient's body 302. It will be appreciated that an anatomical atlas 306 may include a generalized three-dimensional model of relevant portions of a human anatomy stored in a computer readable storage device that may be virtually aligned with a patient's anatomy to provide an indication of what tissue types to expect to be within a field of view of a camera 308, such as a camera field of view from different viewing perspectives.

D. Patient Position and Camera Position

As used herein, the term "pose" refers to the position of an object in six degrees of freedom transform (3 translation and 3 rotation). Pose of an anatomical object such as anatomical tissue may refer to the position of the object in six degrees of freedom transform. Pose of a camera may refer to the position of the camera in six degrees of freedom transform.

An anatomical object that is the subject of a surgical or diagnostic procedure may be difficult to distinguish from other anatomical objects displayed within a camera image. Differentiating tissue types in a surgical setting sometimes may be difficult. Certain anatomical objects and certain tissues types may have similar appearance in some circumstances. During a surgical or diagnostic procedure, different tissue types often may be obscured by a layer of fat. Moreover, the appearance of a tissue type may change as a surgical or diagnostic procedure progresses (due to blood, cautery, manipulation, etc.). During a minimally invasive procedure, knowledge of the patient's position relative to a camera may be used to improve identification of tissue types by limiting the selection of possible tissue types that could possibly be present in a camera image.

Anatomical objects visible within a field of view of an endoscopic camera during a minimally invasive surgical or diagnostic procedure, also referred to as a minimally invasive surgical procedure (MIS procedure) or a laparoscopic procedure, may include one or more of a variety of different tissue types such as blood vessels, fatty tissue, nerve fiber or organ tissue such as lung, kidney and liver, for example. The relative pose between the camera and the patient anatomy can be a factor in the ability to distinguish between similar-seeming images of different anatomical objects, since the camera image of an anatomical object such as organ tissue, may vary significantly depending upon camera pose relative to anatomical object pose.

Figure 4A:
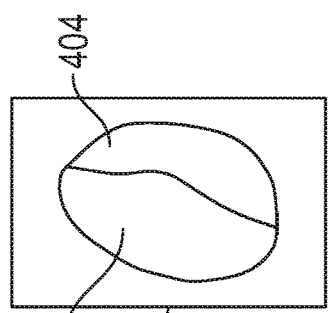
FIGS. 4A-4D are illustrative drawings showing a device display screen displaying unclassified images of first and second anatomical objects viewed in four different example poses.
Figure 4B:
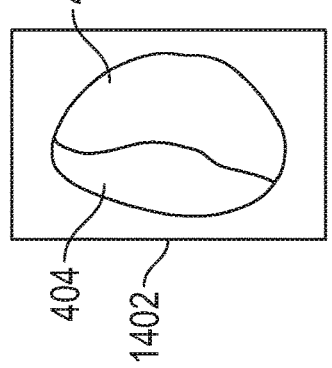
Figure 4C:
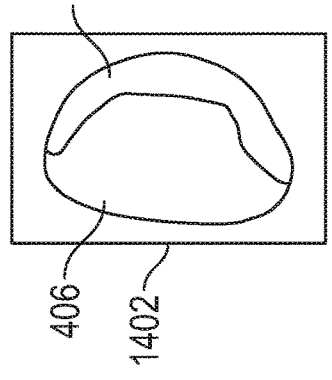
Figure 4D:
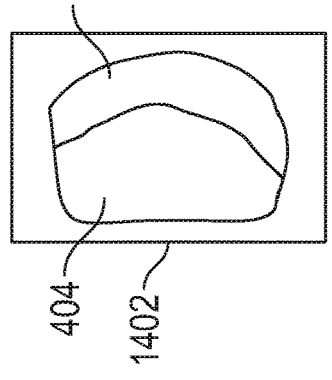
Figure 4E:
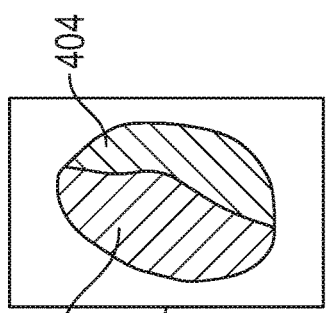
FIGS. 4E-4H are illustrative drawings showing a device display screen displaying classified images of first and second anatomical objects viewed in the same four different example poses shown in FIGS. 4A-4D.
Figure 4F:
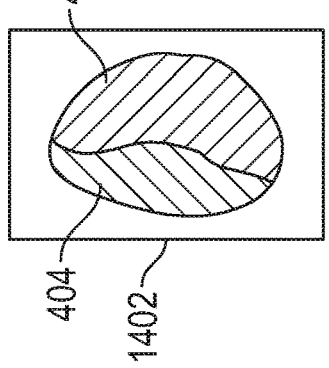
Figure 4G:
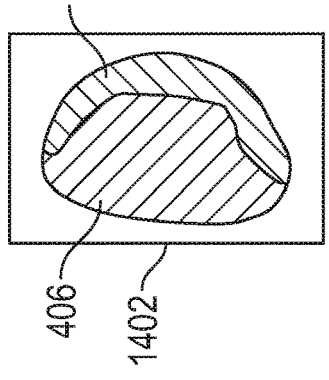
Figure 4H:
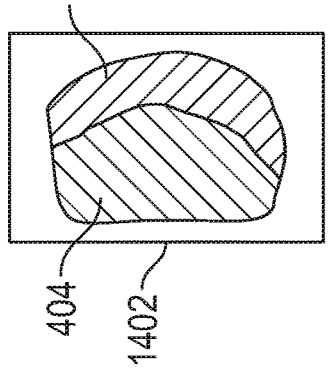

FIGS. 4A-4D are illustrative drawings showing a device display screen 1402 displaying unclassified images of first and second anatomical objects 404, 406 viewed in four different example poses. The display screen 1402 may be a computer display screen other display device to display camera images of an anatomical scene, such as camera images from within a patient's anatomy, captured by an endoscopic camera during a minimally invasive surgical or diagnostic procedure, for example. The first and second anatomical objects 404, 406 may be spleen and liver, respectively, for example. FIG. 4A is an illustrative drawing showing the first and second anatomical objects 404, 406 in a first pose, which may involve a patient positioned face up on an operating table. FIG. 4B is an illustrative drawing showing the first and second anatomical objects 404, 406 in a second pose, which may involve a patient positioned face down on an operating table. FIG. 4C is an illustrative drawing showing the first and second anatomical objects 404.406 in a third pose, which may involve a patient positioned on his or her right side on an operating table. FIG. 4D is an illustrative drawing showing the first and second anatomical objects 404, 406 in the fourth pose, which may involve a patient positioned on his or her left side on an operating table. As will be appreciated from the drawings of FIGS. 4A-4D, the two anatomical objects 404, 406 may appear similar and may be difficult to distinguish based upon visual inspection of the anatomic objects 404, 406 in their native appearances without more information. The challenge of distinguishing between the two anatomical objects can be increased during a medical procedure due to blood, smoke due to cauterization, fat or tissue deformation, for example.

FIGS. 4E-4H are illustrative drawings showing a device display screen 1402 displaying classified images of first and second anatomical objects 404, 406 viewed in the same four different example poses shown in FIGS. 4A-4D. The shading of the first and second objects 404, 406 in the displays of FIGS. 4E-4H indicates their different classifications. For example, display screen pixels within portions of the display screen 1402 displaying the first object (spleen) 404 may be shaded blue, and pixels within portion of the display screen 1402 displaying the second object (liver) 406 may be shaded yellow. Without such shading, using only the naked eye, boundaries between tissue types may be difficult to discern. The shading, therefore, may assist medical personnel to distinguish between different tissue types. To accurately classify the images within a display screen 1402, the pixels used to illuminate the images must be individually classified. As explained more fully below, CNNs may be used to classify individual pixels according to anatomical object type. The pixel classifications in turn may be displayed, on the display screen 1402, as shading or coloring of the images, displayed on the display screen 1402, of the classified anatomical objects. Thus, as explained below, pixel level classifications may be displayed (e.g., as shading or coloring) on a display screen 1402.

Figure 5A:
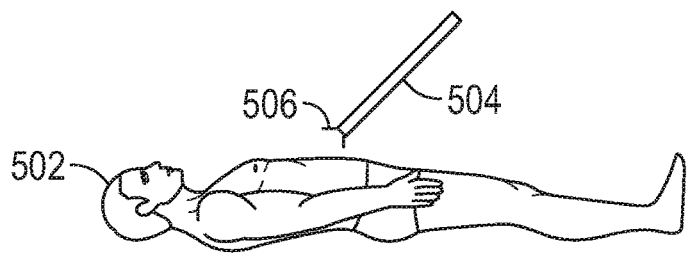
FIGS. 5A-5D are illustrative drawings representing four different patient pose positions in which a camera may view an anatomical object during a minimally invasive surgical or diagnostic procedure.
Figure 5B:
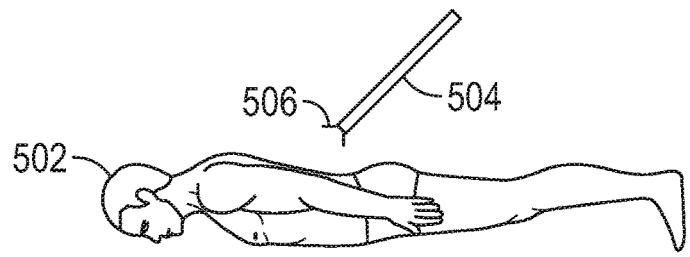
Figure 5C:
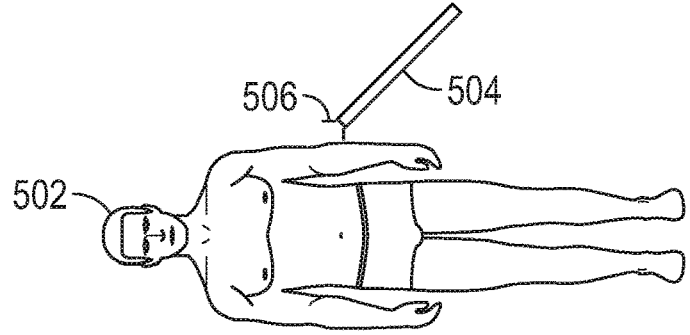
Figure 5D:
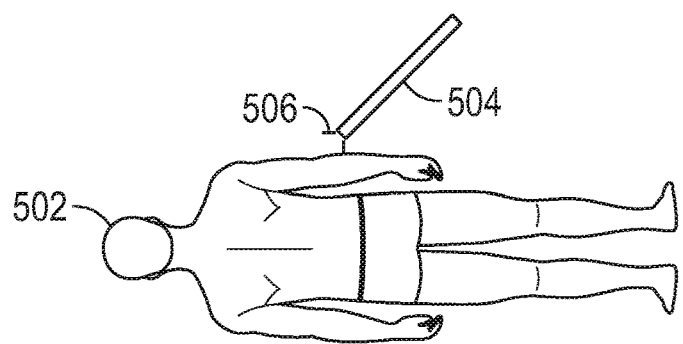

FIGS. 5A-5D are illustrative drawings representing four different example patient poses during an MIS procedure. FIGS. 5A-5D illustrate different possible camera poses and different corresponding camera fields of view. FIG. 5A is an illustrative drawing showing a patient 502 in a first patient position, which corresponds to a face up position in the above chart. FIG. 5B is an illustrative drawing showing the patient 502 in a second patient position, which corresponds to a face down position in the above chart. FIG. 5C is an illustrative drawing showing the patient 502 in a third patient position, which corresponds to a right side position in the above chart. FIG. 5D is an illustrative drawing showing the patient 502 in fourth patient position, which corresponds to a left side position in the above chart. FIGS. 5A-5D show a camera 504 and a camera frame of reference 506 in different alternative example camera poses with respect to the patient 502 in the different patient poses.

Figure 6:
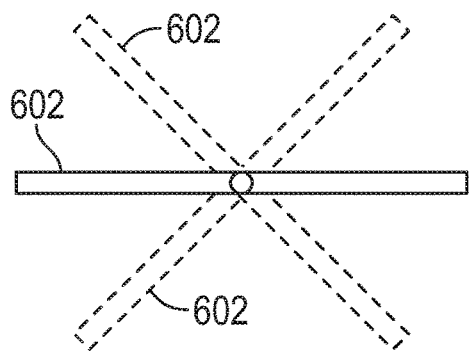
FIG. 6 is an illustrative drawing representing an operating room table on which a patent may be disposed with dashed lines indicating different possible table tilt positions.
Figure 7A:
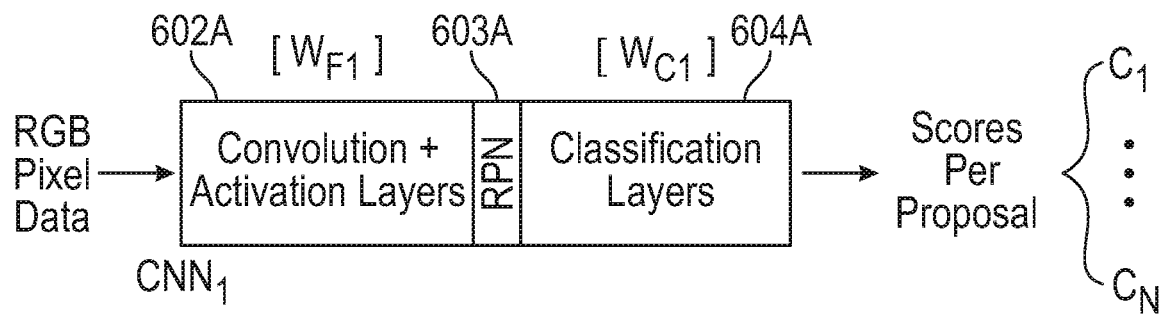
FIGS. 7A-7D are illustrative block diagrams representing separate CNNs ($CNN_1$-$CNN_4$) trained to classify images based upon image pixel data for corresponding different ranges of anatomical object poses with respect to a camera.
Figure 7B:
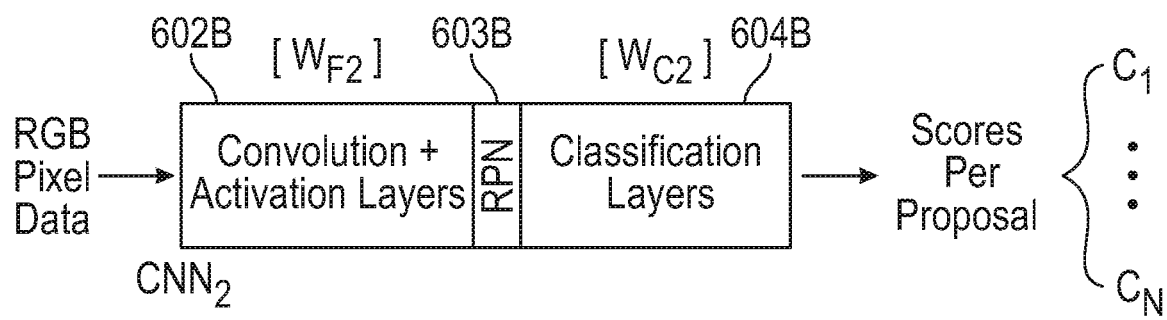
Figure 7C:
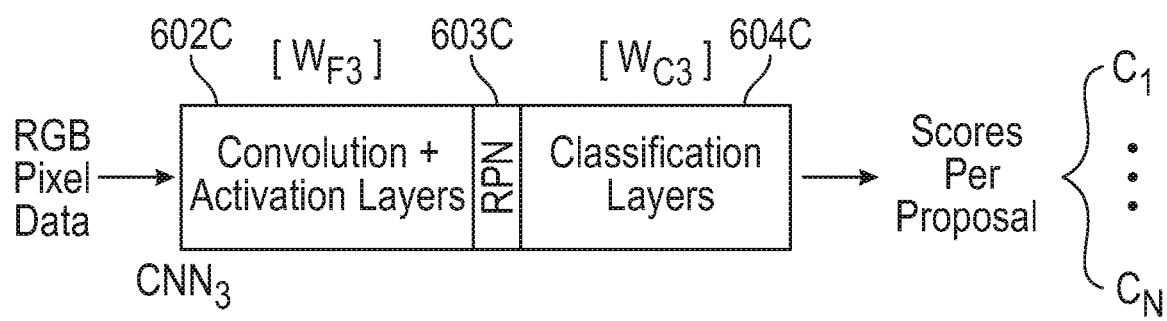
Figure 7D:
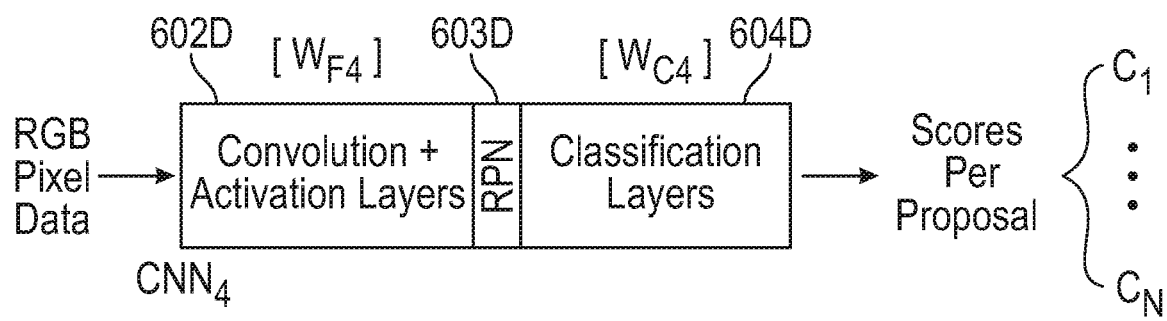

Operating room table 602 position may be a factor in determining pose of an anatomical object. FIG. 6 is an illustrative drawing representing an operating room table on which a patent may be disposed with dashed lines 602 indicating different possible table tilt positions. Table height also may be adjusted, although not shown.

E. Camera Transforms

Camera pose may be determined by assuming that the camera is located at (0,0,0), with +Y up, looking down the −Z axis. The camera's focal length and image center defines its projection transform. A model+view transform for an anatomical object may be encoded as a translation plus quaternion in the camera reference frame. As used herein the term 'camera reference frame' refers to a coordinate frame associated with a camera. For example, in some embodiments, a camera reference frame is centered between the two eyes, with +X left, +Y up, +Z out of the camera. See, A. Kendall et al., PoseNet: A convolutional network for Real-Time 6-DOF Camera Relocalization, IEEE International Conference on Computer Vision (ICCV), 2015, pp. 2938-2946.

In accordance with some embodiments, a pose of an anatomical object with respect to a camera reference frame may be determined based upon a combination of a pose of an (operating room) table with respect to pose of a camera frame, a pose of a patient with respect to a table reference frame, and a pose of the anatomical object with respect to a patient reference frame.

More particularly, a pose of a table with respect to a camera reference frame may be defined as the 4×4 homogeneous transform $X_t^c$.

A pose of a patient with respect to a table reference frame may be defined as the 4×4 homogeneous transform $X_p^t$.

A pose of an anatomical object with respect to a patient reference frame may be defined as the 4×4 homogeneous transform $X_o^p$.

A pose of an anatomical object with respect to a camera reference frame may be defined as the composite camera transform chain $X_o^c = X_t^c X_p^t X_o^p$.

More particularly, for example, a transform of the table surface with respect to the camera reference frame may be derived via fiducial markers on the table base plus knowledge of the table tilt, Trendelenburg, or inferred from knowledge of the instrument cannula positions, as sensed by the robotic manipulators (See, Methods and devices for table pose tracking using fiducial markers, WO 2015142802 A1, and System and method for integrated surgical table, WO 2016069648 A1).

More particularly, for example, a transform of the patient with respect to the table may be estimated, e.g., by a CNN, using an external view (e.g., RGB and/or depth cameras mounted on the surgical cart, in the operating room, etc.), or specified by the operator at the start of the procedure.

More particularly, for example, a transform of an anatomical object, such as an internal tissue structure, with respect to the patient reference frame may be estimated based on data from an anatomical atlas aligned with the patient body (model of anatomical object positions relative to a common reference frame), an estimate of the patient size used to scale the anatomical atlas (e.g., generated by the CNN above), and an estimate of the deformations resulting from gravity, insufflation, etc., if significant.

Figure 14:
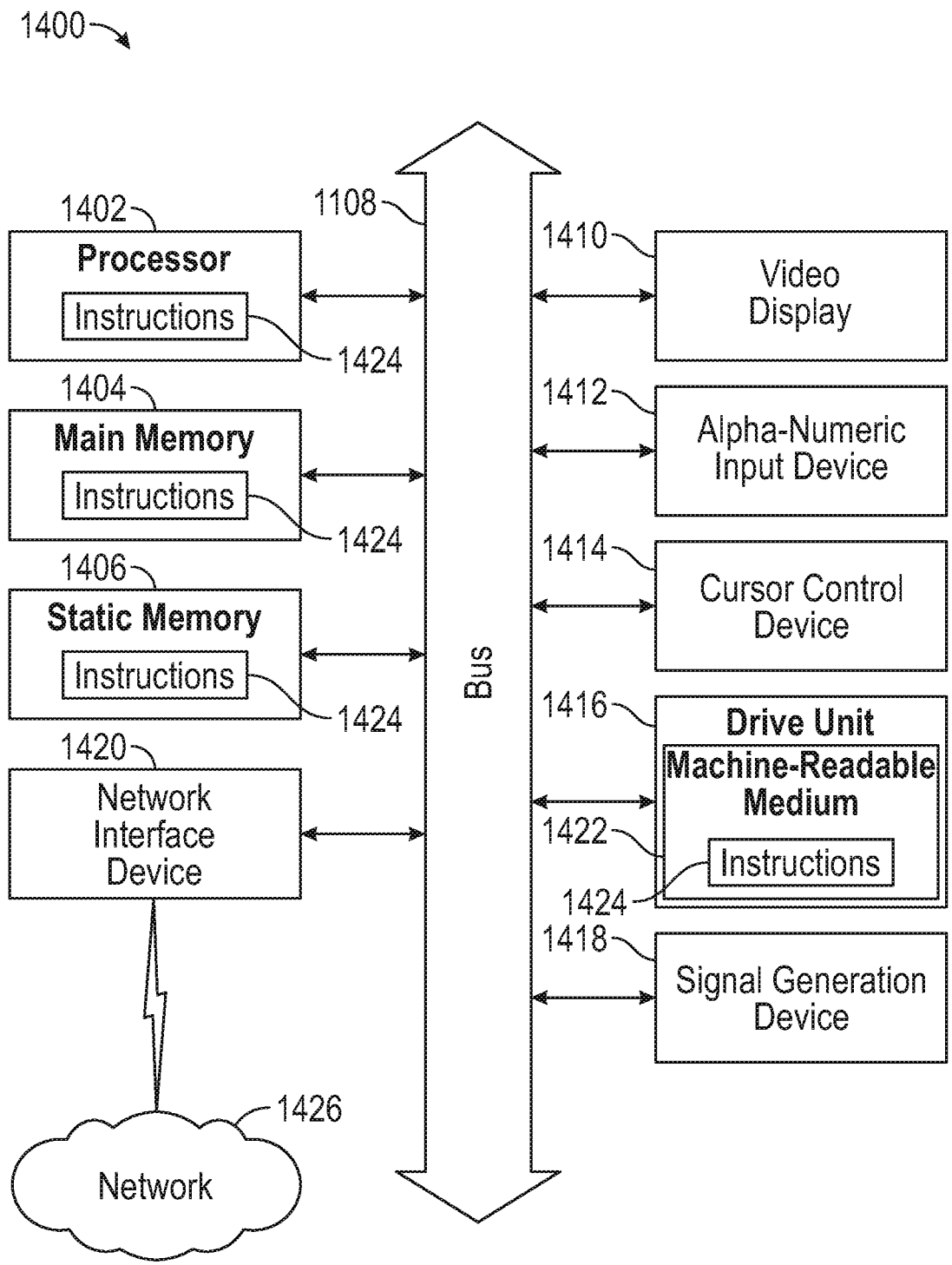
FIG. 14 is an illustrative block diagram of a computer system in accordance with some embodiments.

F. Training Different CNNs to Segment Anatomical Objects for Different Poses of an Anatomical Object with Respect to a Camera Reference Frame FIGS. 7A-7D are illustrate block diagrams representing separate CNNs ($CNN_1$-$CNN_4$) trained to classify anatomical object images based upon image pixel data for different ranges of anatomical object poses with respect to a camera reference frame. Referring to FIG. 14, discussed below, a computer system 1400 may be configured with executable instructions 1424 stored in storage media 1404, 1406, 1416 to implement the CNNs ($CNN_1$-$CNN_4$). For example, a camera (not shown) looking down into the pelvis is a different anatomical object pose from the anatomical object pose in which a camera looks up into the chest. The CNNs may be trained using anatomical object images that vary naturally for different patients. Moreover, for example, the CNNs may be trained using anatomical object images at different points in an MIS procedure, using images of anatomical objects undergoing surgical manipulation, and using images of anatomical objects in the presence of cautery smoke and/or blood. The CNNs also may be trained using images augmented through adjustment of color (e.g., hue, saturation), and/or through image rotation and/or cropping, for example.

Each $CNN_1$-$CNN_4$ receives pixel information for a two-dimensional (2D) arrangement of pixel data that includes each pixel of an image captured by a camera, which may include RGB, depth/distance and/or additional color channels such as infrared (IR) wavelengths. Each $CNN_1$-$CNN_4$ outputs a set of classification scores $C_1$-$C_N$. Each $CNN_1$-$CNN_4$ includes convolution and activation layers 602A-602D to generate image feature maps and region of interest proposals. Each $CNN_1$-$CNN_4$ includes an RPN 603A-603D to define ROI proposals. Each $CNN_1$-$CNN_4$ also includes one or more classification layers 604A-604D, that may include one or more FCNs, to produce image classification scores used to classify images within region of interest proposals. The image feature maps and classifications produced by $CNN_1$-$CNN_4$ in response to input images are determined based upon corresponding sets of feature weights $[W_{F1}]$-$[W_{F4}]$, which may be stored in the storage media and corresponding sets of classification weights [WC1]-[WC4], which may be stored in the storage media.

Each $CNN_1$-$CNN_4$ is trained to segment one or more tissue types. More particularly, each different one of $CNN_1$-$CNN_4$ may be trained to segment camera images of one or more tissue types for a different viewpoint. Each different viewpoint corresponds to a different pose of the one or more specific tissue types with respect to a camera reference frame. Some tissue types may appear within camera images of more than one pose with respect to a camera reference frame. Moreover, each respective $CNN_1$-$CNN_4$ may be trained to identify one or more respective tissue types using training data images under a variety of different conditions such as during surgical manipulation, occurrence of smoke and/or leakage of, blood, for example. At runtime during an MIS procedure, for example, the pose of anatomical objects with respect to a camera reference frame may be used to determine a set of tissue types expected to be within a camera field of view and to select one or more than one of $CNN_1$-$CNN_4$ to perform classification to identify tissue type(s) within the camera field of view. More particularly, for example, an anatomical model may be transformed to at least roughly match the patient's pose and size. The model then may be queried for a list of expected tissue types that are within a camera's field of view (i.e. look at the model with a virtual camera, with the same viewpoint as the endoscope is looking at the patient—this may provide a set of expected tissue types which can be used as a basis to select a CNN).

Training data for different poses may be used to train different ones of $CNN_1$-$CNN_4$ to distinguish between different tissue types such as between the tissue types in the following chart.

| CNN/Tissue Classification Chart | |
|---|---|
| CNN# | Tissue Types Classified |
| CNN1 | lung, heart, liver |
| CNN2 | spleen, kidney, gall bladder, |

-continued

CNN/Tissue Classification Chart

| CNN# | Tissue Types Classified |
|---|---|
| CNN3 | stomach, lung, liver |
| CNN4 | stomach, omentum, fat, small/large intestine |

A first training data set is used to train a first $CNN_1$. The first training data set includes a multiplicity of different training images showing of a first set of tissue types such as lung, heart and liver tissue, for example, captured by a camera at a first range of poses of one or more anatomical structures with respect to a camera reference frame (i.e. relative pose between the anatomy and the camera), such as with the patient face up as in FIG. 5A, and under a variety of different conditions (e.g., surgical manipulation, smoke, blood). The feature weights $[W_{F1}]$ that configure the convolution and activation layers 602A and the RPN 603A and that include classification weights $[W_{C1}]$ that configure the classification layers 604A of $CNN_1$ are determined based upon the first training data set. A second training data set is used to train a second $CNN_2$. The second training data set includes a multiplicity of different training images of a second set of tissue types such as spleen, kidney and gall bladder, for example, captured by a camera at a second range of poses of one or more anatomical structures with respect to a camera reference frame, such as with the patient face down as in FIG. 5B, and under a variety of different conditions. The feature weights $[W_{F2}]$ that configure the convolution and activation layers 602B and the RPN 603B and that include classification weights $[W_{C2}]$ that configure the classification layers 604B of $CNN_2$ are determined based upon the second training data set. A third training data set is used to train a third $CNN_3$. The third training data set includes a multiplicity of different training images of a third set of tissue types such as stomach, lung and liver, for example, captured by a camera at a third range of poses of one or more anatomical structures with respect to a camera reference frame, such as with the patient laying on right side as in FIG. 5C, and under a variety of different conditions. The feature weights $[W_{F3}]$ that configure the convolution and activation layers 602C and the RPN 603C and that include classification weights $[W_{C3}]$ that configure the classification layers 604C of $CNN_3$ are determined based upon the third training data set. A fourth training data set is used to train a fourth $CNN_4$. The fourth training data set includes a multiplicity of different training images of a fourth set of tissue types such as stomach, omentum, fat and small/large intestine captured by a camera at a fourth range of poses of one or more anatomical structures with respect to a camera reference frame, such as with the patient laying on left side as in FIG. 5D, and under a variety of different conditions. The feature weights $[W_{F4}]$ that configure the convolution and activation layers 602D and the RPN 603D and that include classification weights $[W_{C4}]$ that configure the classification layers 604D of $CNN_4$ are determined based upon the fourth training data set.

Figure 8:
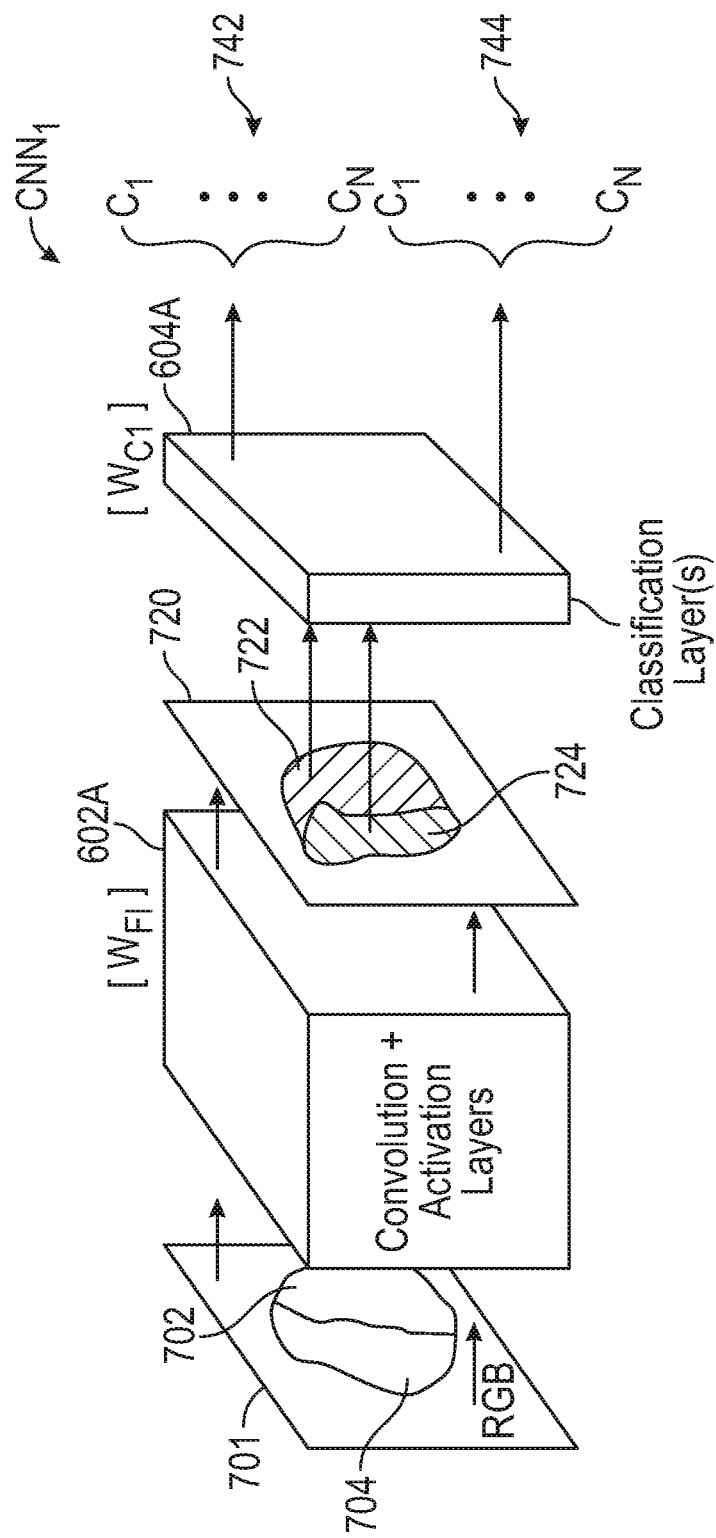
FIG. 8 is an illustrative functional block diagram representing segmentation of object images of an input image provided to a CNN trained to classify images based upon image pixel data for a one of the anatomical object poses of FIGS. 7A-7D.

FIG. 8 is an illustrative functional block diagram representing use of the first $CNN_1$ to segment object images. Pixel RGB color information 701 may be provided as input to the first $CNN_1$. In addition, or in the alternative, color channel information such as infrared (IR) wavelengths may be provided as input to the first $CNN_1$. Depth/distance information also may be provided as input to the first $CNN_1$.

Assume, for example, that the pixel image data 701 includes first object image data 702 representing lung tissue adjacent to second object image data 704 representing heart tissue. Convolution and activation layers 602A of the first $CNN_1$ produces a feature map 720, an RPN section of the first $CNN_1$ produces a first region of interest proposal 722 corresponding to the first object image data 702 and a second region of interest proposal 724 corresponding to the second object image data 704. A classification section 604A of the first $CNN_1$ classifies the contents of the first region proposal 722 to produce first classification scores 742 corresponding to the first object image data 702. The classification section 604A of the first $CNN_1$ classifies the contents of the second region of interest proposal 724 to produce second classification scores 744 corresponding to the second object image data 704.

Classification information determined by the first $CNN_1$, may be used, for example, as a basis to add to a user interface (UI) display showing the pixel image data 701, classification information such as a label 'lung' adjacent the first object image data 702 and to add a label 'heart' adjacent the second object image data 704. Alternatively, for example, the determined classification information may be used as a basis to align a segmented preoperative image (not shown) of a lung to the first object image data 702 and to align a segmented preoperative image (not shown) of a heart to the second object image data 704. In this case of alignment of preoperative image data with object image data 702 and/or 704, the classification results may be used as a basis to improve a temporal procedure segmentation although not be directly shown or reported to a user.

Figure 9:
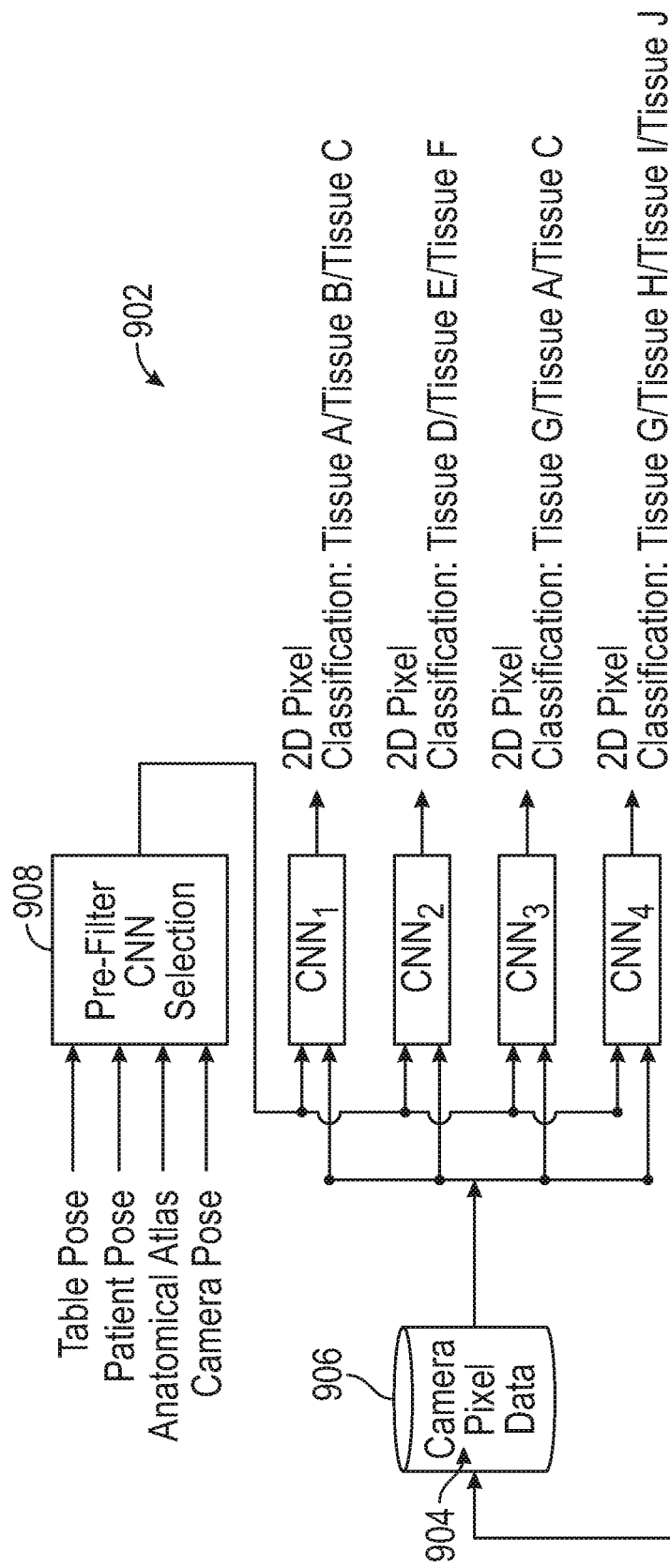
FIG. 9 is an illustrative block diagram representing a first pixel segmentation system in accordance with some embodiments.

G. Pose-Based Pre-Filtering to Select a CNN Trained to Segment Specific Tissue Types FIG. 9 is an illustrative block diagram representing a first pixel segmentation system 902 in accordance with some embodiments. A camera 504 is configured to capture camera images comprising two-dimensional arrays of camera pixel data 904 representing anatomy objects of a patient 502 lying upon an operating table 602, for storage in a storage medium 906. The pixel data 904 may include motion picture data such as video data, for example. The first pixel segmentation system 902 includes multiple CNNs, $CNN_1$-$CNN_4$. As explained above, with reference to FIGS. 7A-7D and FIG. 8, different ones of $CNN_1$-$CNN_4$ may be configured through training to classify tissue types expected to appear within a camera field of view at different poses of a patient's anatomy with respect to a camera reference frame 506. A computer system, such as computer system 1400 described below with reference to FIG. 14, may be configured with executable instructions, such as instructions 1424 to implement a pre-filter CNN selection block 908 to select one or more of the $CNN_1$-$CNN_4$ to classify a 2D arrangement of camera pixel data.

The pre-filter CNN selection block 908 receives table pose information, patient pose information, anatomical atlas information and camera pose information. The pre-filter CNN selection block 908 determines the pose of the patient anatomy 502 with respect to the camera based upon the camera transforms described above. The pose of the patient anatomy with respect to the camera 504 is used to determine what tissue types are expected to be within the camera field of view, and therefore, the tissue types expected to be represented by the captured pixel data 904. The pre-filter CNN selection block 908 selects one or more of $CNN_1$-$CNN_4$ that is best suited for pixel segmentation of the expected tissue types.

The selected one or more of $CNN_1$-$CNN_4$ are trained to segment the pixel data based upon tissue type. More particularly, the selected one or more of $CNN_1$-$CNN_4$ are trained to classify individual pixel represented within the pixel data according to tissue type. As explained with reference to FIGS. 4A-4G, pixel classifications according to tissue type may be used to display different tissue types appearing on a user interface display screen 1402 in different colors. Alternatively, for example, pixel classifications may be used to label different tissue types appearing on a display screen 1402 as representing different tissue types, for example. For example, a first $CNN_1$, may be configured through training to segment pixel data into pixel data corresponding to lung, heart and liver tissues; a second $CNN_2$ may be configured through training to segment pixel data into pixel data corresponding to spleen, kidney and gall bladder tissues: a third $CNN_3$ may be configured through training to segment pixel data into pixel data corresponding to stomach, lung and liver tissues: and a fourth $CNN_4$ may be configured through training to segment pixel data into pixel data corresponding to stomach, omentum, fat, small/large intestine tissues.

Figure 10:
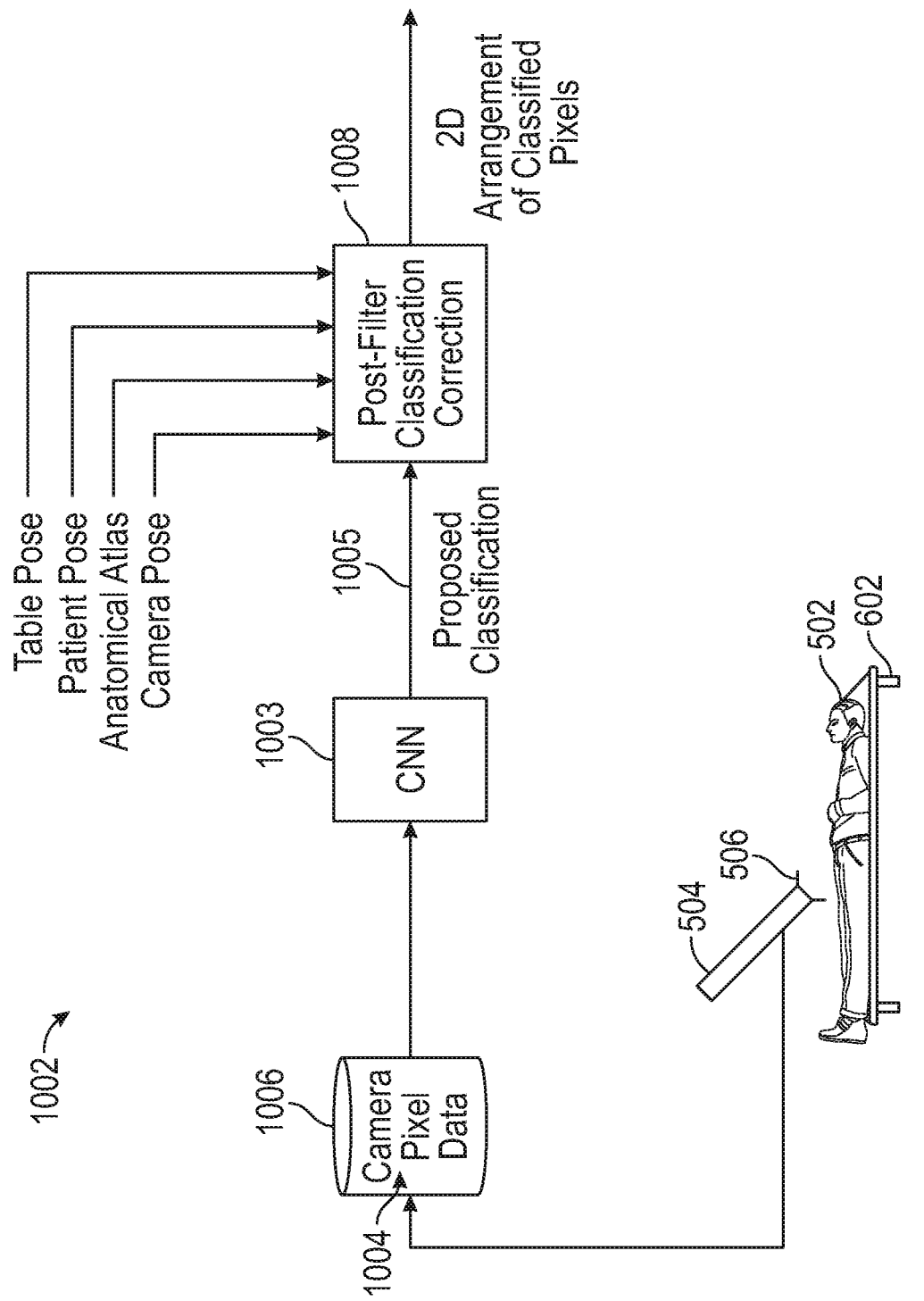
FIG. 10 is an illustrative block diagram representing a second pixel segmentation system in accordance with some embodiments.

H. Pose-Based Post-Filtering of Pixel Classifications by a CNN Trained to Segment Tissue Types to Identify Invalid Classifications FIG. 10 is an illustrative block diagram representing a second pixel segmentation system 1002 in accordance with some embodiments. A camera 504 is configured to capture camera images comprising two-dimensional arrays of camera pixel data 1004 representing anatomy objects of a patient 502 lying upon an operating table 602, for storage in a storage medium 1006. The pixel data 1004 may include motion picture data such as video data, for example. The second pixel segmentation system 1002 includes a CNN 1003 that includes a convolution and activation layers an RPN and a FCN layer (not shown), as described above, that may be trained to segment a wider range of different tissue types than are the individual CNNs, $CNN_1$-$CNN_4$ of the first pixel segmentation system. A computer system 1400 may be configured with executable instructions 1424 stored in memory media 1404, 1406, 1416 to implement the CNN 1003 and a post-filter classification correction logic block 1008 to identify invalid classifications based upon pose of the patient anatomy with respect to the camera. The CNN 1003 provides proposed pixel classification data 1005 to the post-filter classification correction block 1008, which filters the proposed pixel classification data 1005 based upon pose of an anatomical object within the anatomy of the patient 502 with respect to a camera reference frame 506 to identify pixel classification errors within the proposed pixel classification data 1005.

More specifically, in some embodiments, the CNN 1003 is configured through training to output a proposed classification for each pixel of a 2D arrangement of pixel values captured by the camera 504. A proposed pixel classification value may include a probability value for each of multiple possible different classification of the pixel (e.g., liver, spleen, heart, lung, omentum, nerves, fat, blood vessels, etc.), and the post-filter 1008 may modify one or more of the pixel classification probability values for one or more of the pixels based upon pose information. For example, the probability of seeing a lung when the camera is positioned to look down the pelvis is low. Thus, for example, the post-filter may reduce a CNN output classification probability value indicating a high probability that an object in view of a camera is a lung when pose information indicates that the camera is looking down the pelvis. For each pixel, the resulting error-corrected highest classification probability value following post-filtering by the post-filter 1008 is selected as the final pixel classification. In some embodiments low classification values may be filtered out based upon a threshold value. Classification values not meeting the threshold may be ignored or treated as unknown, for example.

In accordance with some embodiments, the post-filter classification correction logic block 1008 receives table pose information, patient pose information, anatomical atlas information and camera pose information. The post-filter classification correction block 1008 determines the pose of one or more anatomy objects of a patient 502 with respect to the camera 504 based upon the camera transforms described above. The pose of the patient anatomy object with respect to the camera determines what tissue types to expect to be within the camera field of view, and therefore, the different tissue types represented by different pixels of a received 2D arrangement of pixel data 1004. The post-filter classification correction block 1008 filters the pixel classifications to identify and correct erroneous pixel classifications based upon pose of the patient anatomy with respect to the camera as described above.

Figure 11:
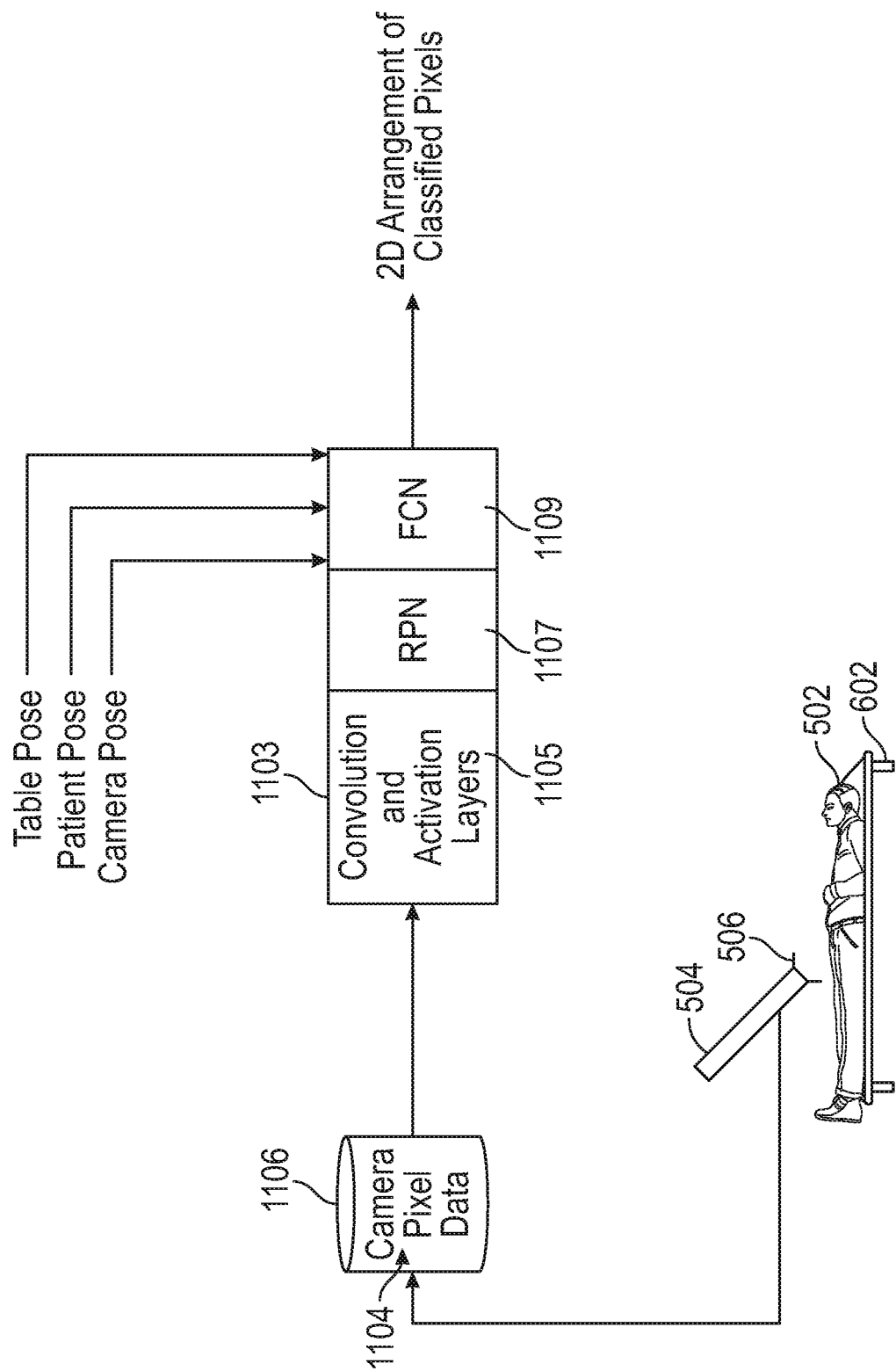
FIG. 11 is an illustrative block diagram representing a third pixel segmentation system in accordance with some embodiments.

I. Pose-Based Fully-Connected Laver in a CNN Trained to Segment Tissue Types FIG. 11 is an illustrative block diagram representing a third pixel segmentation system 1102 in accordance with some embodiments. A camera 504 is configured to capture camera images comprising two-dimensional arrays of camera pixel data 1104 representing anatomy objects of a patient 502 lying upon an operating table 602, for storage in a storage medium 1106. The pixel data 1104 may include motion picture data such as video data, for example. The third pixel segmentation system 1102 includes a CNN 1103 that includes convolution and activation layers 1105 an RPN 1107 and a fully-connected layer (FCN) 1109 trained based upon anatomical object pose with respect to a camera reference frame 506. A computer system 1400 may be configured with executable instructions 1424 stored in memory media 1404, 1406, 1416 to implement the CNN 1103. The CNN 1103 is configured through training to classify tissues across a variety of anatomical object poses with respect to the camera reference frame 504. Thus, the CNN 1103 may be trained to distinguish between a wider range of different tissue types than are the individual CNNs, $CNN_1$-$CNN_4$ of the first pixel segmentation system 902, for example. The FCN layer 1109 receives as input, information indicative of the relative pose between an anatomy object within the patent 502 and the camera reference frame 506 (encoded as a quaternion+translation), and also receives as input camera calibration parameters (e.g., one or more of focal length, image center). The FCN layer 1109 imparts feature information indicative of anatomical object pose with respect to camera pose to feature maps produced by the convolution and activation layers 1105. The CNN 1103 receives as input, the 2D arrangement of camera pixel data 1104, information indicative of the relative pose between an anatomy object within a patient 502 and the camera reference frame 506 (encoded as quaternion+translation), and the camera calibration parameters (e.g., focal length, image center), and produces a 2D arrangement of pixel-level classification data. It will be appreciated that, in essence, training of the CNN 1103, which includes the fully-connected layer 1109 containing a camera model, builds an anatomical atlas into the CNN 1103. In other words, the third pixel segmentation system 1102 learns a three-dimensional model of overall anatomy and of the anatomical objects therein. Thus, anatomical atlas information may not be required as input.

Figure 12:
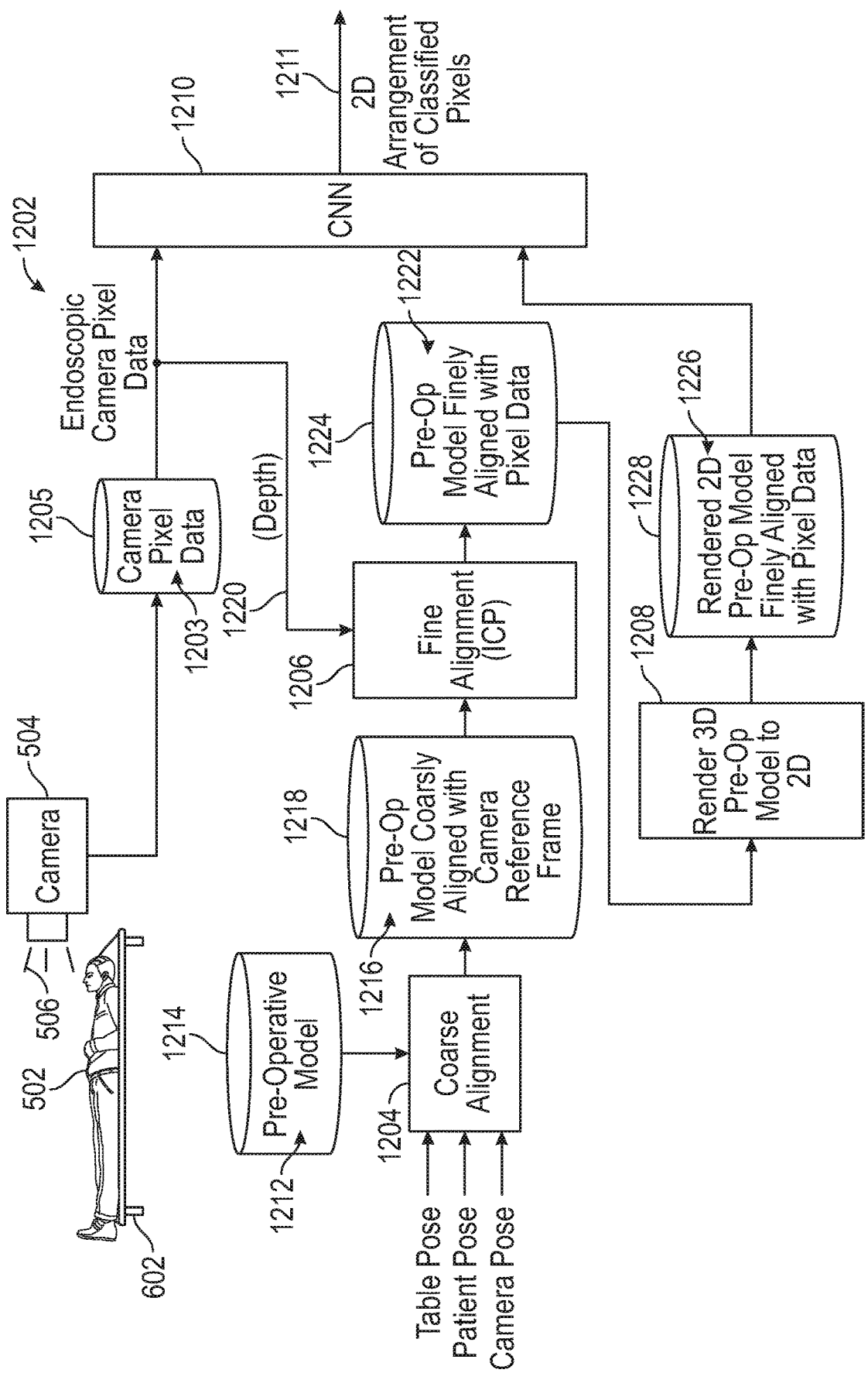
FIG. 12 is an illustrative block diagram representing a fourth pixel segmentation system in accordance with some embodiments.

J. Preoperative Model Aligned to Provide Hints to a CNN Trained to Segment Tissue Types, with Model Alignment to Drive Pixel-Level Segmentation FIG. 12 is an illustrative block diagram representing a fourth pixel segmentation system 1202 in accordance with some embodiments. A camera 504 is configured to capture camera images comprising two-dimensional arranges of camera pixel data 1203 representing anatomy objects of a patient 502 lying upon an operating table 602, for storage in a storage medium 1205. The pixel data 1203 may include motion picture data such as video data, for example. A computer system 1400 may be configured with executable instructions 1424 stored in memory media 1404, 1406, 1416 to implement the fourth pixel segmentation system 1202, which includes a coarse alignment logic block 1204, a fine alignment logic block 1206, a 3D-to-2D renderer block 1208 and a CNN 1210. In some embodiments, the CNN 1210 includes convolution and activation layers, an RPN and a FCN layer (not shown), as described above, trained to segment tissue types. In some embodiments, the CNN 1210 is trained based upon camera images captured from multiple different anatomical object poses with respect to one or more camera reference frames and based upon two-dimensional (2D) renderings of three-dimensional (3D) preoperative models of anatomical objects to classify pixels of 2D arrangements of pixel values, captured by a camera during an MIS or laparoscopic procedure, for example, according to anatomical object type. Thus, the CNN 1210 is configured through training, to classify individual pixels within a 2D arrangement of pixel values according to object type and to base the pixel-level segmentation classifications at least in part upon hints provided by a two-dimensional preoperative model of tissue structures. In some embodiments, during training the CNN 1210, both labeled 2D renderings of a pre-operative model and corresponding labeled endoscopic images comprising 2D arrangements of pixel values of patient anatomy are provided as training input. The CNN 1210 is thereby trained to use the 2D pre-operative model renderings as hints to predict classifications for pixels within captured 2D arrangements of pixels representing images of patient anatomy.

In operation, a preoperative model 1212 stored in a memory medium 1214 may be obtained that include a three-dimensional (3D) image scan data model that includes a three-dimensional image representation of relevant portions of a patient's anatomy including scan data models of individual anatomical tissue objects. An image scanning system (not shown) may produce the preoperative model 1212 prior to a diagnostic or surgical procedure, for example. Preoperative three-dimensional (3D) image scan data that indicate the physical tissue constituency at discreet three-dimensional volumetric locations within an anatomical tissue structure may be produced using a scanning system such as, Computerized Tomography (CT), Magnetic Resonance Imaging (MRI) or Ultrasound techniques, for example. Alternatively, in accordance with some embodiments, a preoperative model 1212 may include a generalized anatomical atlas (not shown). The physical anatomical tissue structure (not shown), within a patient 502, that is to be scanned may include one or more anatomical objects such as kidney tissue, liver tissue, blood vessels, bone and nerve fibers, for example. Three-dimensional locations within the preoperative image scan data model 1212 correspond to three-dimensional locations within the physical anatomical tissue structure of the patient 502. The smallest 3D location unit may be referred to as a voxel. The 3D preoperative image scan data model 1212 may include individual voxels corresponding to individual three-dimensional locations within the physical tissue structure. A pixel in a camera image may correspond to a 2D slice of a voxel within the 3D preoperative model. The individual voxel values (grey scale values or color values) may represent the density of the physical tissue at corresponding locations within the physical tissue structure, and therefore, may be used as a basis for hints as to segmentation of different tissue types represented in captured camera images of patient anatomical structure represented in 2D arrangements of pixels. Different types of tissues such as bone and blood vessels, for example, have different densities, and therefore, a voxel value at a 3D location within the image scan data may be indicative of tissue type at a corresponding 3D location within the physical tissue structure. Preoperative image scan data may be converted to the preoperative 3D model 1212 of the patient anatomy and stored as a mesh (e.g. a set of triangles for computer graphics, etc.). See, W. Lorenesn et al., Marching Cubes: A High Resolution 3D Surface Construction Algorithm, Computer Graphics, vol. 21, No. 4, July 1987. Different tissue types may be represented by different grey scales or different colors, for example. Moreover, different tissue types may be labeled to indicate tissue type, for example; the grey scales or colors themselves may act as labels.

In operation, the coarse alignment logic block 1204 receives as input, information indicative of pose of an anatomical object with respect to the camera reference frame, which may include table pose information, patient pose information, camera pose information. The coarse alignment logic block 1204 also receives the preoperative model 1212, which may include an anatomical atlas. The coarse alignment logic block 1204 aligns the preoperative model 1212 with the camera frame of reference based upon the pose of an anatomical object with respect to the camera reference frame. The pose of the anatomical object with respect to a camera reference frame may be determined based upon the above-described camera transforms, for example. More particularly, the coarse alignment logic block 1204 determines a view or orientation of the 3D model 1212 that substantially matches a view of the anatomical represented by the captured 2D arrangement of pixel values and designates the matching view or orientation as the aligned preoperative model 1212. The coarse alignment block 1204 produces a 3D coarse alignment view 1216 of the preoperative model with respect to the camera reference frame 506 that may be saved in a memory device 1218.

The fine alignment logic block 1206 receives as input the 3D coarsely aligned preoperative model view 1216 and pixel depth data 1220. In some embodiments, the camera 504 is implemented as a stereo camera and the pixel depth data 1220 includes stereo pixel depth data. Depth information may be determined for individual pixels of the captured 2D pixel data 1203, using well known techniques based upon stereo images, which in turn may be used to more closely align the individual pixels within the captured 2D pixel data 1203 with individual voxels (or with vertices) from slices at different depths of the 3D preoperative model 1212. More particularly, in accordance with some embodiments, the fine alignment block 1206 receives stereo 2D arrangements of pixel data 1203 captured by the camera 504 and determines the pixel depth information 1220 based upon distance between corresponding pixels in the two stereo images. The fine alignment block 1206 may be configured to use an iterative closest point (ICP) procedure to finely align surface geometry of the 3D preoperative model 1212 with geometry features imaged within the captured 2D pixel data 1203 based upon the camera pixel depth data 1220. It is noted that fine alignment using ICP generally is better suited to rigid pose changes than to tissue deformation changes. Fine alignment may be required due to shifting of internal anatomical objects due to gravity or insufflation, for example. The fine alignment block 1206 produces a finely aligned 3D preoperative model view 1222, which is saved in a memory device 1224.

The 3D-to-2D rendering logic block 1208 receives as input the finely aligned 3D preoperative model view 1222 and produces as output a rendered 2D preoperative model 1226, which includes pixels that correspond to and are aligned with pixels of the captured 2D pixel data 1203. The 2D preoperative model is saved in a memory device 1228.

The CNN 1210 receives as input the captured 2D pixel data 1203 and the rendered 2D preoperative model 1226. Due to the coarse and fine alignment stages, the pixels of the rendered 2D preoperative model 1226 are substantially aligned with pixels of the captured 2D pixel data 1203. Labels provided for pixels of the 3D pre-operative model 1212 may be passed along to pixels of the rendered 2D preoperative model 1226 to generate per-pixel labels for the rendered 2D preoperative model 1226. The CNN 1210 is trained to segment tissue types within the captured 2D pixel data 1203 on a per-pixel basis and also to use pixel data from the rendered 2D preoperative model 1226 for hints in performing the per-pixel segmentation. The CNN 1210 provides as output, pixel-level classifications 1211 indicating a pixel-level segmentation of anatomical object images that may be used to label individual pixels within a display screen 1402.

It will be appreciated that in a stereo vision system, the L and R eye viewers have a slightly different perspective view, so we may choose to align and render the aligned preoperative model to match either view, and then run it through the CNN. Alternatively, we may choose to align a 3D preoperative model based upon pixel depth for both L and R views and render the aligned preoperative model for both L and R views and run both through the CNN sequentially. Or, alternatively, we may choose to align a 3D preoperative model based upon pixel depth for both L and R views and render the aligned preoperative model for both L and R views and run them through the CNN at the same time by packing L and R either side-by-side, top-bottom, or line-interleaved, for example.

Figure 13:
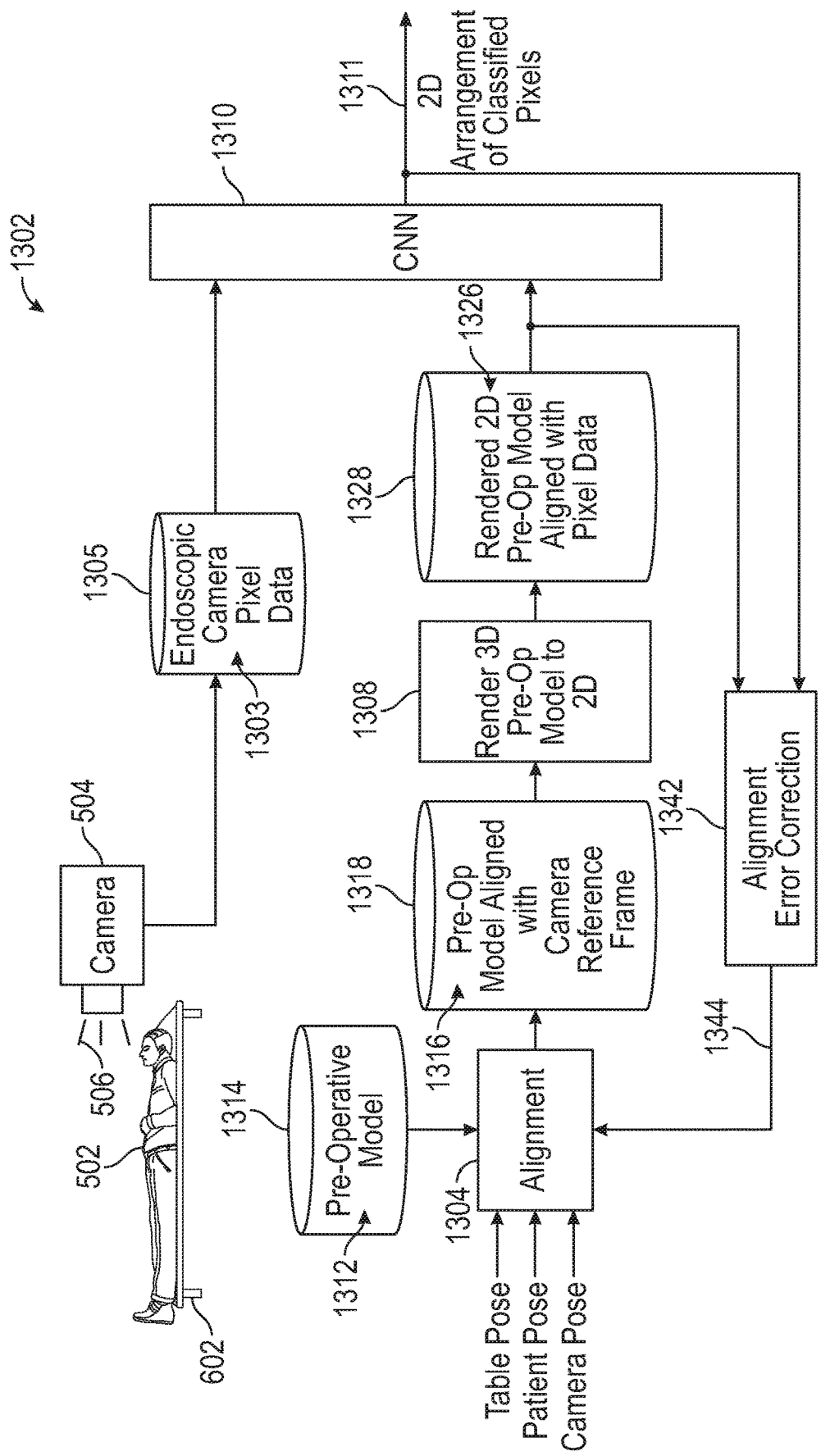
FIG. 13 is an illustrative drawing representing a fifth pixel segmentation system in accordance with some embodiments.

K. Preoperative Model Aligned to Provide Hints to a CNN Trained to Segment Tissue Types, with Pixel-Level Segmentation Driving the Model Alignment FIG. 13 is an illustrative drawing representing a fifth pixel segmentation system 1302 in accordance with some embodiments. A camera 504 is configured to capture camera images comprising two-dimensional arrays of camera pixel data 1303 representing anatomy objects of a patient 502 lying upon an operating table 602, for storage in a storage medium 1305. The pixel data 1303 may include motion picture data such as video data, for example. A computer system 1400 may be configured with executable instructions 1424 stored in memory media 1404, 1406, 1416, may be configured to implement the fifth pixel segmentation system 1302, which includes an alignment logic block 1304, a 3D-to-2D renderer 1308, an alignment error-correction feedback block 1342 and a CNN 1310. In some embodiments, the CNN 1310 includes convolution and activation layers, an RPN and a FCN layer (not shown), as described above, trained to segment tissue types. The training data may include labeled 2D arrangements of pixels data captured by an endoscopic camera representing anatomical objects within a patient's anatomy, and corresponding labeled 2D renderings of 3D preoperative models of the anatomical objects. The CNN 1310 is thereby trained to use the reference preoperative images as hints when doing per-pixel classification of 2D arrangements of pixel data, captured during a surgical or diagnostic procedure, representing anatomical structures. The CNN 1310 also is configured to base segmentation classifications at least in part upon hints provided by a corresponding rendered 2D preoperative model of tissue structures.

In operation, a preoperative model 1312 stored in a memory medium 1314 may be obtained that include a three-dimensional (3D) image scan data model that includes a three-dimensional image representation of relevant portions of a patient's anatomy including scan data models of individual anatomical tissue objects. As explained above, a preoperative model may include a three-dimensional (3D) image scan data model that includes a 3D image representation of relevant portions of a patient's anatomy including anatomical tissue objects. Alternatively, the preoperative model may include a generalized anatomical atlas.

In operation, the coarse alignment logic block 1304 receives as input, information indicative of pose of an anatomical object with respect to the camera reference frame, which may include table pose information, patient pose information, camera pose information. The coarse alignment logic block 1304 also receives the preoperative model 1312, which may include an anatomical atlas. In some embodiments, the alignment block 1304 operates similar to coarse alignment block 1204 of FIG. 12. In particular, the coarse alignment logic block 1304 aligns the preoperative model 1312 with the camera frame of reference based upon the pose of an anatomical object with respect to the camera reference frame. The pose of the anatomical object with respect to a camera reference frame may be determined based upon the above-described camera transforms, for example. More particularly, the coarse alignment logic block 1304 determines a view or orientation of the 3D model 1312 that substantially matches a view of the anatomical represented by the captured 2D arrangement of pixel values and designates the matching view or orientation as the aligned preoperative model 1312. The coarse alignment block 1304 produces a 3D coarse alignment view of the preoperative model 1316 of the preoperative model with respect to the camera reference frame 506 that may be saved in a memory device 1318.

The 3D coarse alignment view of the preoperative model 1316 is provided as input to the 3D-to-2D rendering logic block 1308. Rendered 2D preoperative model pixel data 1326 aligned with the camera frame is produced based upon the aligned surface geometry of the 3D model 1316 and is saved in a memory device 1328 as output from the 3D-to-2D rendering block 1308.

The CNN 1310 receives as input the captured 2D arrangement of camera pixel data 1303 and the rendered 2D preoperative model 1326. Due to the alignment stage, including alignment error-correction feedback block 1342, the rendered 2D preoperative model pixel data 1326 is substantially aligned with the captured 2D arrangement of camera pixel data 1303. Per-voxel labels provided for the 3D pre-operative model 1312 may be used to generate corresponding per-pixel labels for the rendered 2D preoperative model 1326. The CNN 1310 is configured based upon training to perform pixel-level segmentation of tissue types represented in captured 2D arrangement of camera pixel data 1303 that may represent one or more anatomical objects, and also, is configured to use a corresponding rendered 2D preoperative model 1326 for hints to the pixel-level segmentation. The CNN 1310 provides as output, pixel-level classifications 1311 that may be used to label individual pixels within a display screen 1402.

The alignment error-correction feedback logic block 1342 receives as input the rendered 2D preoperative model 1326 and pixel-level output classifications 1311. The alignment error correction feedback logic block 1342 produces as output, pixel alignment error information 1344 that in some embodiments, may include a pose correction transform $X_c^{c'}$, between the nominal anatomical object position (c') in the camera reference frame 506, as expected from the previously described camera transform chain, and the actual anatomical object position (c) as observed by the camera 504.

This pose correction transform information may be determined by minimizing pixel-level classifications that do not match corresponding labels of pixels of the rendered 2D preoperative model. For example, a mismatch between a threshold number pixel labels from some region of the rendered 2D preoperative model and pixel classifications produced by the CNN may indicate a misalignment. A threshold level may be selected to be large enough so that system noise or minor pixel misalignments involving only a few pixels do not trigger detection of an alignment error. The pixel alignment error information 1344 may provide an indication to the alignment logic block 1304 of a location of the 3D preoperative model 1302 that is misaligned with the actual anatomical object pose.

In some embodiments, the alignment logic block 1304 receives pose correction transform information provided by the alignment error-correction feedback block and concatenates it with the previously described transform chain as:

$$X_o^c = X_c^{c'} X_t^{c'} X_p^t X_o^p.$$

to generate an updated alignment transform.

L. Computer System Embodiment

FIG. 14 is an illustrative block diagram of a computer system 1400. The computer system 1400, or variations thereof, may be configured according to executable instructions 1424 to act as system to implement the disclosed CNNs and imaging systems. In some embodiments, the computer system 1400 operates as a standalone device or may be connected (e.g., networked) to other computers. In a networked deployment, the computer system may operate in the capacity of a server or a client computer in server-client network environment, or as a peer computer in a peer-to-peer (or distributed) network environment, for example. In a networked deployment, the computer may operate in the capacity of a server or a client computer in a server-client network environment, or as a peer computer in a peer-to-peer (or distributed) network environment, for example.

The example computer system 1400 includes one or more hardware processors 1402 (e.g., a central processing unit (CPU), a graphics processing unit (GPU) or both), main memory 1404 and static memory 1406, which communicate with each other via bus 1408. The computer system 1400 may further include video display unit 1410 (e.g., a plasma display, a liquid crystal display (LCD) or a cathode ray tube (CRT)). The display unit 1410 may be used to implement the display 1402 of FIGS. 4A-4G, for example. The computer system 1400 also includes alphanumeric input device 1412 (e.g., a keyboard), a user interface (UI) navigation device 1414 (e.g., a mouse, touch screen, or the like), an SSD or disk drive unit 1416, a signal generation device 1418 (e.g., a speaker), and a network interface device 1420.

The DRAM, SSD or disk drive unit 1404, which can act as a storage memory device, includes computer-readable storage device 1404, 1406 on which is stored one or more sets of instructions and data structures (e.g., software 1424) embodying or utilized by any one or more of the methodologies or functions described herein. The software 1424 may also reside, completely or at least partially, within a computer readable storage device such as the main memory 1404 and/or within the processor 1402 during execution thereof by the computer system 1400, the main memory 1404, 1406 and the processor 1402 also constituting non-transitory computer-readable media. One or more CNNs may be stored in the DRAM, SSD or disk drive unit 1416 or in an external server as explained above. The software 1424 may further be transmitted or received over network 1420 via a network interface device 1420 utilizing any one of a number of well-known transfer protocols (e.g., HTTP). The storage memory device 1416 can be configured to store feature weights and classification weights and instructions executable by the one or more processors that, when executed, cause the one or more processors to implement a CNN, for example.

EXAMPLES

Example 1 includes an imaging system for surgical or diagnostic medical procedures comprising: a camera to capture images of an anatomical object and to represent the images in two-dimensional (2D) arrangements of pixels; one or more processors and a non-transitory computer readable medium operably coupled thereto, the non-transitory computer readable medium comprising information including: CNN instructions executable by the one or more processors that, when executed, cause the one or more processors to implement a CNN configured according to selectable sets of weights, to associate anatomical object classifications with pixels of the 2D arrangements of pixels; and multiple sets of weights, to differently configure the CNN implemented by the one or more processors, based upon different camera image training data; and a display screen configured to display the two-dimensional (2D) arrangements of classified pixels and associated anatomical object classifications.

Example 2 includes the subject matter of Example 1, further including: CNN selection logic to select a set of weights from among the multiple sets of weights to configure the CNN implemented by the one or more processors, based upon pose of the anatomical object with respect to a reference frame of the camera.

Example 3 includes the subject matter of Example 1, wherein each set of weights corresponds to a set of training data that includes camera images captured for ranges of poses of one or more anatomical objects with respect to one or more camera reference frames; and wherein each set of training data includes camera images captured for different ranges of poses of the one or more anatomical objects with respect to one or more camera reference frames than the other sets of training data.

Example 4 includes the subject matter of Example 1, wherein the CNN implemented by the one or more processors includes a one or more convolution and activation layers, a region proposal network layer and one or more classification layers.

Example 5 includes the subject matter of Example 4, wherein each of the different sets of weights includes a different set of feature weights to configure the convolution and activation layers of the CNN implementation and a different set of classification weights to configure the one or more classification layers of the CNN implementation.

Example 6 includes the subject matter of Example 1, a display screen displaying the two-dimensional (2D) arrangements of classified pixels with associated anatomical object classifications.

Example 7 includes an imaging system for surgical or diagnostic medical procedures comprising: a camera to capture images of an anatomical object and to represent the images in 2D arrangements of pixels; one or more processors and a non-transitory computer readable medium operably coupled thereto, the non-transitory computer readable medium comprising instructions executable by the one or more processors, including: CNN instructions that, when executed, cause the one or more processors to implement a CNN configured to associate anatomical object classifications with pixels of the 2D arrangements of pixels; CNN classification selection logic to adjust one or more classification values produced by the CNN for the 2D arrangements of pixels, based upon pose of the anatomical object with respect to a reference frame of the camera; and a display screen configured to display the two-dimensional (2D) arrangements of classified pixels and associated anatomical object classifications.

Example 8 includes the subject matter of Example 7, wherein the CNN implemented by the one or more processors includes a one or more convolution and activation layers, a region proposal network layer and one or more classification layers.

Example 9 includes the subject matter of Example 7, wherein the CNN classification selection logic to adjust the one or more classifications based upon a combination of pose of a table with respect to a camera reference frame, pose of a patient with respect to the table reference frame, pose of an anatomical object with respect to the patient reference frame.

Example 10 includes the subject matter of Example 7, wherein the CNN classification selection logic to adjust the one or more classifications based upon a composite camera transform chain $X_o^c = X_t^c X_p^t X_o^p$; wherein $X_t^c$ represents a transform of a pose of a table with respect to a camera reference frame; wherein $X_p^t$ represents a transform of a patient with respect to a table reference frame; and wherein $X_o^p$ represents a transform of a pose of an anatomical object with respect to a patient reference frame.

Example 11 includes an imaging system for surgical or diagnostic medical procedures comprising: a camera to capture images of an anatomical object and to represent the images in 2D arrangements of pixels; and one or more processors and a non-transitory computer readable medium operably coupled thereto, the non-transitory computer readable medium comprising information including: CNN instructions executable by the one or more processors that, when executed, cause the one or more processors to implement a CNN configured to associate anatomical object classifications with pixels of the 2D arrangements of pixels; wherein the CNN implemented by the one or more processors includes, one or more convolution and activation layers to produce one or more image feature maps based upon one or more 2D arrangements of pixels, and a fully connected layer to associate an anatomical object classification with pixels of the one or more 2D arrangements of pixels based upon the one or more feature maps, relative pose between patient anatomy, and camera calibration information; and a display screen configured to display the two-dimensional (2D) arrangements of classified pixels and associated anatomical object classifications.

Example 12 includes the subject matter of Example 11, wherein the CNN implemented by the one or more processors includes, a region proposal network layer to produce regions of interest based upon the feature maps.

Example 13 includes the subject matter of Example 11, wherein the CNN implemented by the one or more processors includes, a region proposal network layer to identify one or more regions of interest within the one or more feature maps; wherein the fully connected layer to associate an anatomical object classification with pixels of the one or more 2D arrangements of pixels based upon the feature maps within the one or more regions of interest and relative pose between patient anatomy and a camera and to camera calibration information.

Example 14 includes an imaging system for surgical or diagnostic medical procedures comprising: a camera to capture images of an anatomical object and to represent the images in 2D arrangements of pixels; one or more processors and a non-transitory computer readable medium operably coupled thereto, the non-transitory computer readable medium comprising instructions executable by the one or more processors, including: coarse alignment instructions that, when executed, cause the one or more processors to implement a coarse alignment block configured to align voxels of a three-dimensional (3D) preoperative model with pixels of one or more of the two-dimensional (2D) arrangements of pixels based upon pose of an anatomical object with respect to a camera reference frame; fine alignment instructions that, when executed, cause the one or more processors to implement a fine alignment block configured to align voxels of the 3D preoperative model with pixels of one or more of the 2D arrangements of pixels based upon depth information associated with the pixels of the one or more arrangements of pixels and corresponding depths of voxels within the 3D preoperative model; rendering instructions that, when executed, cause the one or more processors to render the aligned 3D preoperative model to produce a rendered 2D arrangement of pixels; CNN instructions that, when executed, cause the one or more processors to implement a CNN configured to associate anatomical object classifications with pixels of the 2D arrangements of pixels based at least in part upon hints provided by the rendered 2D arrangement of pixels; and a display screen configured to display the two-dimensional (2D) arrangements of classified pixels and associated anatomical object classifications.

Example 15 includes the subject matter of Example 14, wherein the coarse alignment block is configured to align voxels of a three-dimensional (3D) preoperative model with pixels of one or more of the two-dimensional (2D) arrangements of pixels based upon a combination of pose of a table with respect to a camera reference frame, pose of a patient with respect to the table reference frame, pose of an anatomical object with respect to the patient reference frame.

Example 16 includes the subject matter of Example 14, wherein the coarse alignment block is configured to align voxels of a three-dimensional (3D) preoperative model with pixels of one or more of the two-dimensional (2D) arrangements of pixels based upon a composite camera transform chain $X_o^c = X_t^c X_p^t X_o^p$; wherein $X_t^c$ represents a transform of a pose of a table with respect to a camera reference frame; wherein $X_p^t$ represents a transform of a patient with respect to a table reference frame; and wherein $X_o^p$ represents a transform of a pose of an anatomical object with respect to a patient reference frame.

Example 17 includes the subject matter of Example 14, wherein the fine alignment block is configured to align voxels of the 3D preoperative model with pixels of one or more of the 2D arrangements of pixels based upon an iterative closest point procedure.

Example 18 includes the subject matter of Example 14, wherein the camera is configured to capture 2D stereo arrangements of pixels; and wherein the fine alignment block is configured to align voxels of the 3D preoperative model with pixels of one or more of the 2D arrangements of pixels based upon pixel depth information associated with distances between corresponding pixels in the two 2D stereo arrangements of pixels.

Example 19 includes the subject matter of Example 14, wherein the CNN implemented by the one or more processors includes a one or more convolution and activation layers, a region proposal network layer and one or more classification layers.

Example 20 includes the subject matter of Example 14, wherein multiple voxels of the 3D preoperative model are labeled to indicate anatomical object type; wherein multiple pixels of the rendered 2D arrangement of pixels are labeled to indicate anatomical object type; wherein the CNN implemented by the one or more processors is configured to use the labels as classification hints.

Example 21 includes the subject matter of Example 14, wherein multiple voxels of the 3D preoperative model are labeled to indicate anatomical object type; wherein the rendering block is configured to pass the labels of voxels of the 3D preoperative model to corresponding pixels of the rendered 2D arrangement of pixels; and wherein the CNN implemented by the one or more processors is configured to use the labels as classification hints.

Example 22 includes an imaging system for surgical or diagnostic medical procedures comprising: a camera to capture images of an anatomical object and to represent the images in one or more 2D arrangements of pixels; one or more processors and a non-transitory computer readable medium operably coupled thereto, the non-transitory computer readable medium comprising instructions executable by the one or more processors, including: coarse alignment instructions that, when executed, cause the one or more processors to implement a coarse alignment block configured to align voxels of a three-dimensional (3D) preoperative model with pixels of one or more of the two-dimensional (2D) arrangements of pixels based upon nominal pose of an anatomical object with respect to a camera reference frame and based upon the pixel alignment error correction information; rendering instructions that, when executed, cause the one or more processors to render the aligned 3D preoperative model to produce a rendered 2D arrangement of pixels; CNN instructions executable by the one or more processors that, when executed, cause the one or more processors to implement a CNN configured to associate anatomical object classifications with pixels of the 2D arrangements of pixels based at least in part upon hints provided by the rendered 2D arrangement of pixels; wherein multiple voxels of the 3D preoperative model are labeled to indicate anatomical object type; wherein multiple pixels of the rendered 2D arrangement of pixels are labeled to indicate anatomical object type; wherein the CNN implemented by the one or more processors is configured to use the labels as classification hints; the instructions executable by the one or more processors further including: alignment correction instructions that, when executed, cause the one or more processors to implement an alignment error correction block configured to identify mismatches between labels associated with pixels of the rendered 2D arrangement of pixels and classifications associated with corresponding classified pixels, and to produce the pixel alignment error correction information based upon the identified mismatches; and a display screen configured to display the two-dimensional (2D) arrangements of classified pixels and associated anatomical object classifications.

Example 23 includes the subject matter of Example 22, wherein the coarse alignment block is configured to align voxels of a three-dimensional (3D) preoperative model with pixels of one or more of the two-dimensional (2D) arrangements of pixels based upon a combination of pose of a table with respect to a camera reference frame, pose of a patient with respect to the table reference frame, pose of an anatomical object with respect to the patient reference frame.

Example 24 includes the subject matter of Example 22, wherein the CNN implemented by the one or more processors includes a one or more convolution and activation layers, a region proposal network layer and one or more classification layers.

Example 25 includes the subject matter of Example 22, wherein the alignment correction block is configured to identify a threshold level of mismatch between labels associated with pixels of the rendered 2D arrangement of pixels and classifications associated with corresponding pixels classified pixels by the CNN.

Example 26 includes the subject matter of Example 22, wherein the alignment correction block is configured to produce the pixel alignment error correction information indicative of difference between the nominal pose of the anatomical object with respect to the camera reference frame indicated by the rendered 2D arrangement of pixels and based upon the anatomical object pose captured by the camera indicated by the 2D arrangement of classified pixels.

The above description is presented to enable any person skilled in the art to create and use an imaging system for pixel level segmentation of images of anatomical tissue. Various modifications to the embodiments will be readily apparent to those skilled in the art, and the generic principles defined herein may be applied to other embodiments and applications without departing from the scope of the invention. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the scope of the invention, which is defined in the appended claims.

What is claimed is:

1. An imaging system for surgical or diagnostic medical procedures comprising:
   a camera to capture images of an anatomical object and to represent the images in two dimensional (2D) arrangements of pixels;
   one or more processors and a tangible computer readable medium operably coupled thereto, the tangible computer readable medium comprising information including:
CNN instructions executable by the one or more processors that, when executed, cause the one or more processors to implement a CNN configured according to selectable sets of weights, to associate anatomical object classifications with pixels of the 2D arrangements of pixels; and multiple sets of weights, to differently configure the CNN implemented by the one or more processors, based upon different camera image training data comprising different poses of one or more anatomical objects with respect to a reference frame of the camera to train the CNN to distinguish between different tissue types based at least on a camera pose relative to an anatomical object pose; and
   a display screen configured to display the two-dimensional (2D) arrangements of classified pixels and associated anatomical object classifications indicating tissue type; and
   wherein the pose of the anatomical object with respect to the camera reference frame is determined based upon a combination of a pose of a table with respect to a pose of a camera frame, a pose of a patient with respect to a table reference frame and a pose of the anatomical object with respect to a patient reference frame.

2. The imaging system of claim 1,
   wherein each set of weights corresponds to a set of training data that includes camera images captured for ranges of poses of one or more anatomical objects with respect to one or more camera reference frames; and
   wherein each set of training data includes camera images captured for different ranges of poses of the one or more anatomical objects with respect to one or more camera reference frames than the other sets of training data.

3. The imaging system of claim 1,
   wherein the CNN implemented by the one or more processors includes a one or more convolution and activation layers, a region proposal network layer and one or more classification layers.

4. The imaging system of claim 3,
   wherein each of the different sets of weights includes a different set of feature weights to configure the convolution and activation layers of the CNN implementation and a different set of classification weights to configure the one or more classification layers of the CNN implementation.

5. The imaging system of claim 1 further including:
   a display screen displaying the two-dimensional (2D) arrangements of classified pixels with associated anatomical object classifications.

6. The imaging system of claim 1, wherein the one or more classification values are adjusted based on a composite camera transform based on a transform of a pose of a table with respect to the camera reference frame, a transform of a patient with respect to the camera reference frame and a transform of the pose of the anatomical object with respect to the patient reference frame.

7. An imaging method comprising:
   using a camera to capture images of an anatomical object and to represent the images in two-dimensional (2D) arrangements of pixels; and
   causing one or more processors to implement a CNN configured according to selectable sets of weights, to associate anatomical object classifications with pixels of the 2D arrangements of pixels; and multiple sets of weights, to differently configure the CNN implemented by the one or more processors, based upon different camera image training data comprising different poses of one or more anatomical objects with respect to a reference frame of the camera to train the CNN to distinguish between different tissue types based at least on a camera pose relative to an anatomical object pose;
   determining the pose of the anatomical object with respect to the camera reference frame based upon a combination of a pose of a table with respect to a pose of a camera frame a pose of a patient with respect to a table reference frame and a pose of the anatomical object with respect to a patient reference frame; and
   displaying on a display screen, the two-dimensional (2D) arrangements of classified pixels and associated anatomical object classifications indicating tissue type.

8. The method of claim 7,
   wherein each set of weights corresponds to a set of training data that includes camera images captured for ranges of poses of one or more anatomical objects with respect to one or more camera reference frames; and
   wherein each set of training data includes camera images captured for different ranges of poses of the one or more anatomical objects with respect to one or more camera reference frames than the other sets of training data.

9. The method of claim 7,
   wherein the CNN implemented using the one or more processors includes a one or more convolution and activation layers, a region proposal network layer and one or more classification layers.

10. The method of claim 9,
    wherein each of the different sets of weights includes a different set of feature weights to configure the convolution and activation layers of the CNN implementation and a different set of classification weights to configure the one or more classification layers of the CNN implementation.

11. The method of claim 7 further including:
    a display screen displaying the two-dimensional (2D) arrangements of classified pixels with associated anatomical object classifications.

12. The imaging method of claim 7, further comprising adjusting the one or more classification values based on a composite camera transform based on a transform of a pose of a table with respect to the camera reference frame, a transform of a patient with respect to the camera reference frame and a transform of the pose of the anatomical object with respect to the patient reference frame.

13. An imaging system for surgical or diagnostic medical procedures comprising:
    a camera to capture images of an anatomical object and to represent the images in two dimensional (2D) arrangements of pixels;

one or more processors and a tangible computer readable medium operably coupled thereto, the tangible computer readable medium comprising information including:

CNN instructions executable by the one or more processors that, when executed, cause the one or more processors to implement a CNN configured according to selectable sets of weights, to associate anatomical object classifications with pixels of the 2D arrangements of pixels; and multiple sets of weights, to differently configure the CNN implemented by the one or more processors, based upon different camera image training data comprising different poses of one or more anatomical objects with respect to a reference frame of the camera to train the CNN to distinguish between different tissue types based at least on a camera pose relative to an anatomical object pose; and a display screen configured to display the two-dimensional (2D) arrangements of classified pixels and associated anatomical object classifications indicating tissue type, and wherein the one or more classification values are adjusted based on a composite camera transform based on a transform of a pose of a table with respect to the camera reference frame, a transform of a patient with respect to the camera reference frame and a transform of the pose of the anatomical object with respect to the patient reference frame.

14. The imaging system of claim 13, wherein the pose of the anatomical object with respect to the camera reference frame is determined based upon a combination of a pose of a table with respect to a pose of a camera frame, a pose of a patient with respect to a table reference frame and a pose of the anatomical object with respect to a patient reference frame.

15. An imaging method comprising:

using a camera to capture images of an anatomical object and to represent the images in two-dimensional (2D) arrangements of pixels; and causing one or more processors to implement a CNN configured according to selectable sets of weights, to associate anatomical object classifications with pixels of the 2D arrangements of pixels; and multiple sets of weights, to differently configure the CNN implemented by the one or more processors, based upon different camera image training data comprising different poses of one or more anatomical objects with respect to a reference frame of the camera to train the CNN to distinguish between different tissue types based at least on a camera pose relative to an anatomical object pose;

adjusting the one or more classification values based on a composite camera transform based on a transform of a pose of a table with respect to the camera reference frame, a transform of a patient with respect to the camera reference frame and a transform of the pose of the anatomical object with respect to the patient reference frame; and displaying on a display screen, the two-dimensional (2D) arrangements of classified pixels and associated anatomical object classifications indicating tissue type.

16. The imaging method of claim 15, further comprising determining the pose of the anatomical object with respect to the camera reference frame based upon a combination of a pose of a table with respect to a pose of a camera frame, a pose of a patent with respect to a table reference frame and a pose of the anatomical object with respect to a patient reference frame.

* * * * *